United States Patent [19]

Asai et al.

[11] Patent Number: 4,646,352
[45] Date of Patent: Feb. 24, 1987

[54] METHOD AND DEVICE FOR MATCHING FINGERPRINTS WITH PRECISE MINUTIA PAIRS SELECTED FROM COARSE PAIRS

[75] Inventors: Koh Asai; Hiroyuki Izumisawa; Katsuaki Owada; Seiichiro Kinoshita; Shunji Matsuno, all of Tokyo, Japan

[73] Assignee: NEC Corporation, Tokyo, Japan

[21] Appl. No.: 508,759

[22] Filed: Jun. 28, 1983

[30] Foreign Application Priority Data

| Jun. 28, 1982 | [JP] | Japan | 57-111114 |
| Jun. 28, 1982 | [JP] | Japan | 57-111115 |
| Jun. 28, 1982 | [JP] | Japan | 57-111116 |
| Jun. 28, 1982 | [JP] | Japan | 57-111117 |
| Jun. 28, 1982 | [JP] | Japan | 57-111118 |
| Jun. 28, 1982 | [JP] | Japan | 57-111119 |
| Jun. 29, 1982 | [JP] | Japan | 57-112216 |
| Jun. 29, 1982 | [JP] | Japan | 57-112217 |
| Jun. 29, 1982 | [JP] | Japan | 57-112218 |
| Jun. 29, 1982 | [JP] | Japan | 57-112219 |

[51] Int. Cl.$^4$ ............................................. G06k 9/68
[52] U.S. Cl. .................................... 382/5; 382/37
[58] Field of Search ............. 356/71; 382/5, 21, 30, 382/34

[56] References Cited

U.S. PATENT DOCUMENTS

| 3,748,644 | 7/1973 | Tisdale | 382/21 |
| 4,135,147 | 1/1979 | Riganati et al. | 382/5 |
| 4,185,270 | 1/1980 | Fischer, II et al. | 382/5 |
| 4,310,827 | 1/1982 | Asai | 382/21 |

Primary Examiner—Leo H. Boudreau
Attorney, Agent, or Firm—Sughrue, Mion, Zinn, Macpeak & Seas

[57] ABSTRACT

A pair candidate list (73) is formed by selecting minutia pairs with reference to a minutia list (71) showing original position and direction data given for minutiae by principal coordinate systems preliminarily selected on a search and a file fingerprint and those relation data of the minutiae which are substantially independent of the coordinate systems. It is very likely that the pair candidate list shows coarse pairs because the coordinate systems may not yet be optimally matched to each other. One of the coordinate systems is transformed by those optimum amounts to provide transformed position and direction data which are decided by the original position and direction data of the minutia pairs of the pair candidate list. A pair list (86) is formed by precisely selecting minutiae from the pair candidate list with reference to the transformed position and direction data and the original position and direction data given by the other principal coordinate system and to the relation data. On forming the pair list, an additional minutia list (81) is preferably formed which shows the transformed position and direction data and the last-mentioned original position and direction data together with the relation data.

10 Claims, 43 Drawing Figures

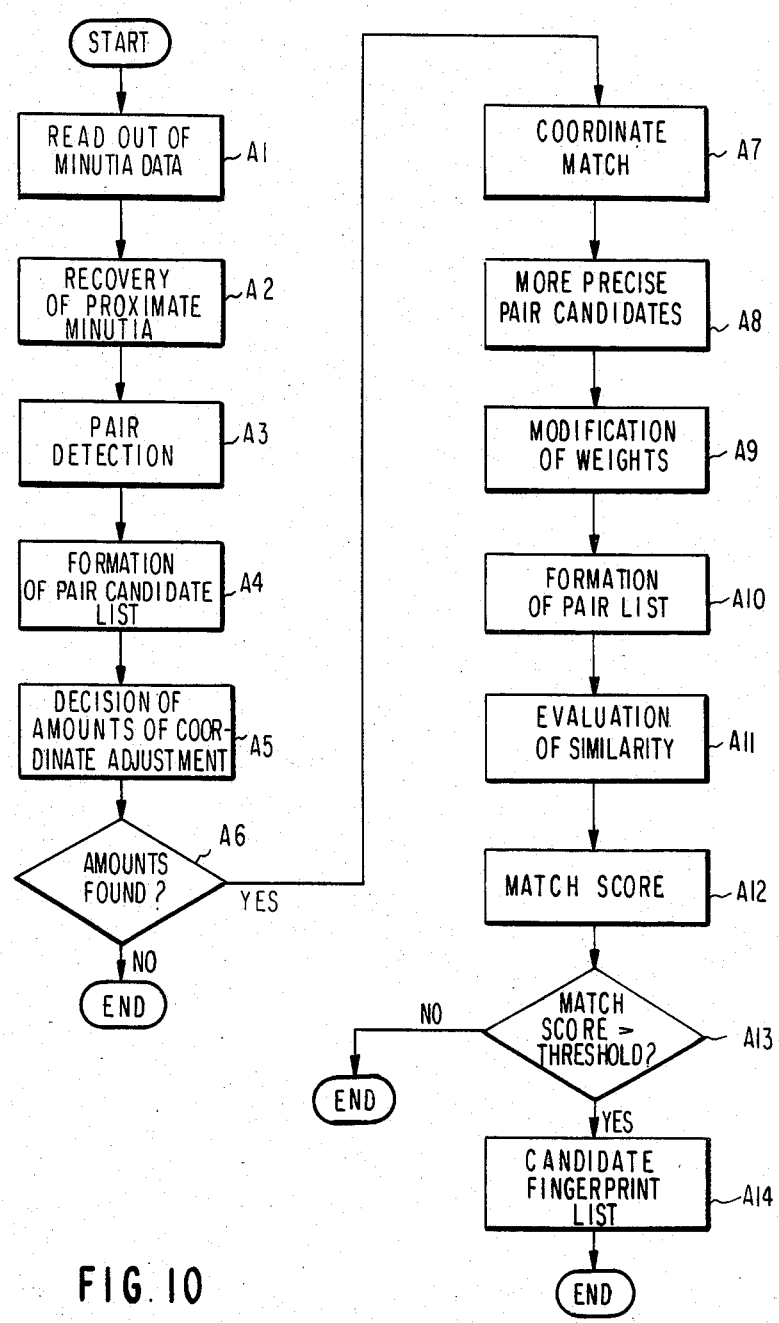
FIG. 9
FIG. 10
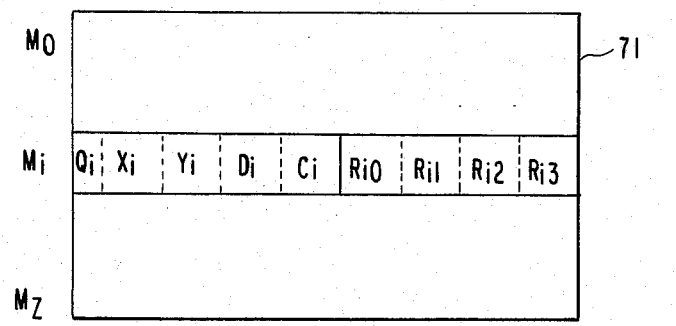

FIG. 25

| | MINUTIA DATA | PRIMARY RELATION DATA | SECONDARY RELATION DATA |
|---|---|---|---|
| | | COMPOSITE RELATION DATA | |

| | 0 | 1 | ... | i | ... | 15 |
|---|---|---|---|---|---|---|
| 0 | $M_{00}$ $W_{00}$ | $M_{0i}$ $W_{0i}$ | | $M_{0j}$ $W_{0j}$ | | |
| 1 | $M_{10}$ $W_{10}$ | $M_{11}$ $W_{11}$ | | $M_{1j}$ $W_{1j}$ | | |
| ... | | | | | | |
| i | $M_{i0}$ $W_{i0}$ | $M_{i1}$ $W_{i1}$ | | $M_{ij}$ $W_{ij}$ | | |
| ... | | | | | | |
| 63 | | | | | | |

| | -8 | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|
| 7 | | | | | | | | | | 1 | | | | | | |
| 6 | | | | | | | | | | | | | | | | |
| 5 | | | | | | | | 1 | | 6 | 2 | | 1 | 1 | | |
| 4 | | | | 3 | | | 1 | | | 1 | 2 | 2 | | 1 | | |
| 3 | | | | | | | 4 | 1 | | | | | 2 | 1 | 1 | |
| 2 | | 1 | | | | | | 1 | | 3 | 4 | 1 | 2 | | | 1 |
| 1 | | 1 | | | | | | | 1 | 2 | | 1 | | | 1 | |
| 0 | | | 2 | | | 4 | 3 | 4 | 4 | 3 | | | 1 | 1 | 1 | |
| -1 | | | | 1 | 1 | 1 | 1 | 8 | 5 | | | | 3 | | | |
| -2 | 1 | 1 | 5 | 1 | | 5 | 3 | 5 | 4 | | 1 | | | | | |
| -3 | 1 | 2 | 2 | | | | | | 1 | | 1 | | | | | |
| -4 | 1 | | | 2 | | | | | 2 | 1 | | | | | | |
| -5 | | | 1 | 1 | | | | | | | | | | | | |
| -6 | | 3 | 1 | 1 | | | | | | | | | | | | |
| -7 | | | 1 | | | | | | | | | | | | 1 | |
| -8 | | | | | | | | | | 1 | | | | | | |

| 1 | 2 | 1 |
|---|---|---|
| 2 | 4 | 2 |
| 1 | 2 | 1 |

216

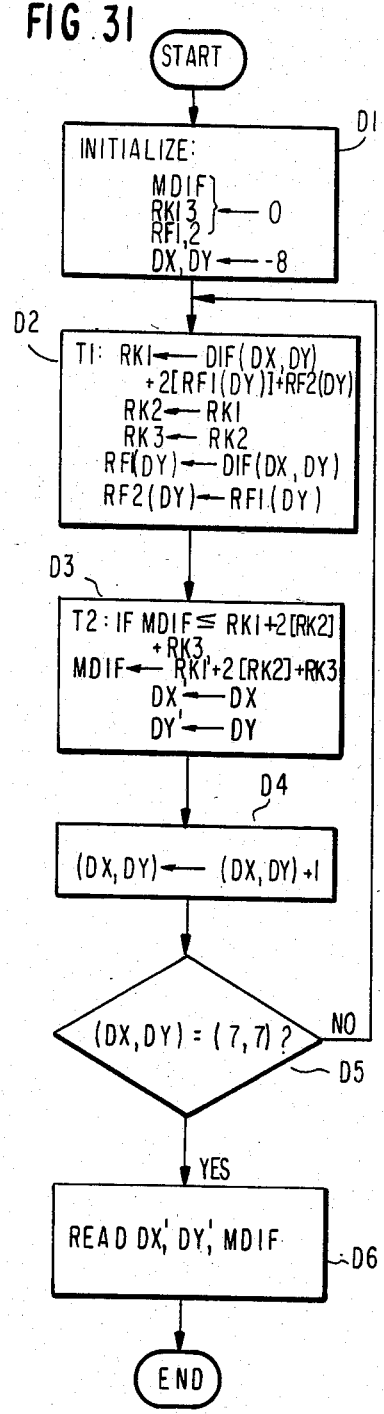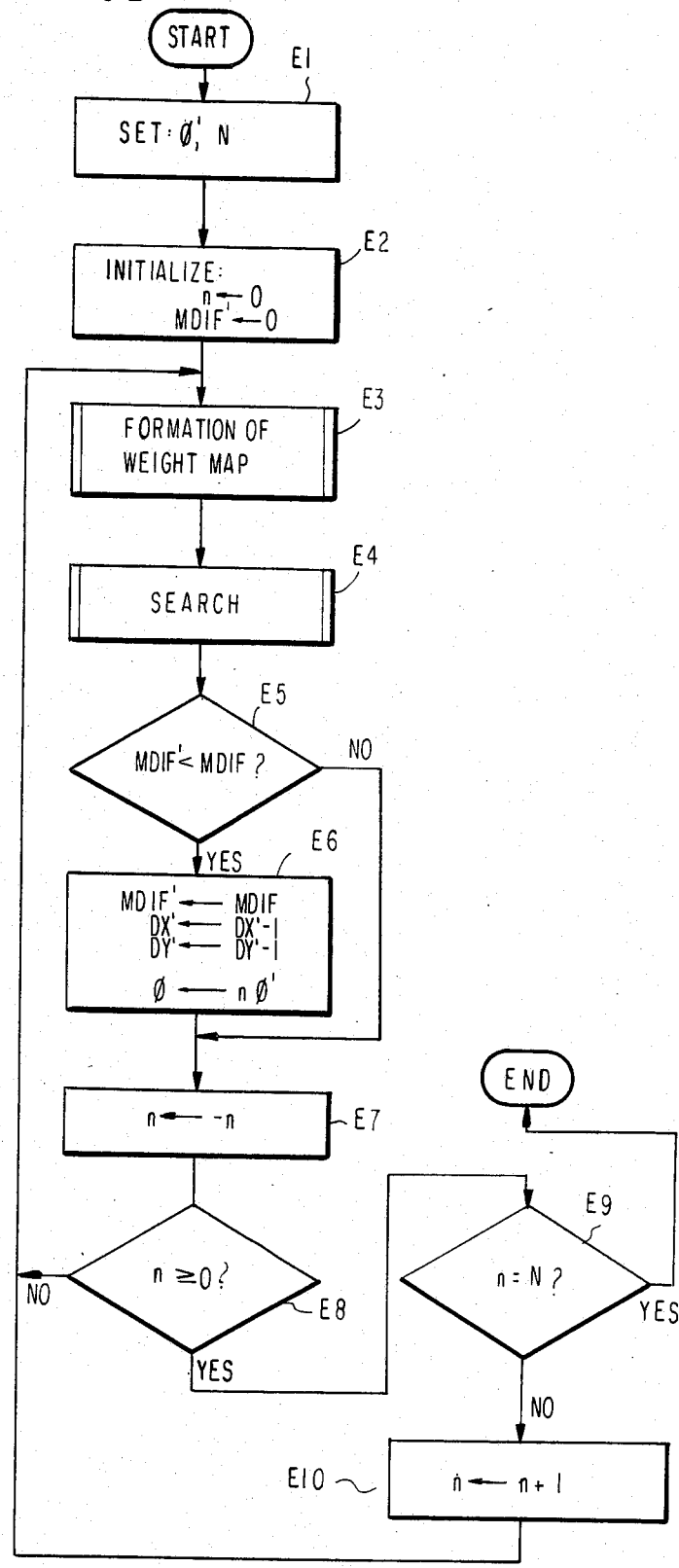

FIG. 33
FIG. 34
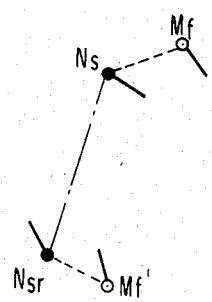
FIG. 35
FIG. 36
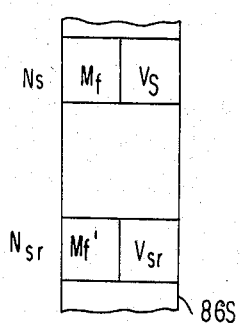
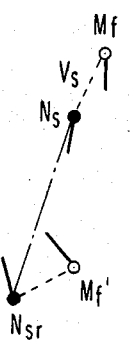
FIG. 37
FIG. 38
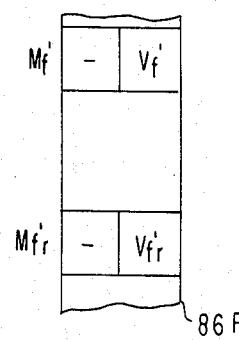
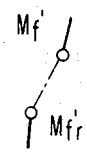

METHOD AND DEVICE FOR MATCHING FINGERPRINTS WITH PRECISE MINUTIA PAIRS SELECTED FROM COARSE PAIRS

BACKGROUND OF THE INVENTION

This invention relates to a method and a device for matching fingerprints.

The word "fingerprint" is herein used as a representative of a fingerprint or a like pattern or figure. More particularly, the finerprint may be an actual finger, a palm print, a toe print, a soleprint, a squamous pattern, and a streaked pattern composed of streaks. The fingerprint may also be a diagram drawn by a skilled person to represent a faint fingerprint remain which is, for example, left at the scene of a crime.

The "matching" is for recognition of a fingerprint with reference to a plurality of known fingerprints. The matching may also be for discrimination, collation, and/or identification of the fingerprint.

A fingerprint to be matched with a known fingerprint, is usually called a search fingerprint. The known fingerprint is called a file fingerprint. Each fingerprint is featured by ridges and more specifically by minutiae.

It is conventional on carrying out the fingerprint matching to select a coordinate system on each fingerprint as will later be described with reference to a few of about forty figures of the accompanying drawing. The coordinate system is used to represent the position or location which each minutia has on the fingerprint. Furthermore, a direction is defined together with the sense in connection with each minutia with reference to the coordinate system. In addition to the position and direction data of each minutia, a local feature characteristic to each minutia is known which is independent of the coordinate system. An example of such a local feature is the difference between types of minutiae. Other examples are "relation data" which are representative of relationships between each minutia and adjacent minutiae. The relation data are substantially independent of the coordinate system as will become clear as the description proceeds with reference to the accompanying drawing. At any rate, the coordinate system will be called a principal coordinate system.

Fingerprint matching has been carried out by comparing the minutia position and direction data and relation data of a search fingerprint with those of each file fingerprint. Inasmuch as the coordinate systems are independently selected on the respective fingerprints, the position and direction data of a fingerprint must be transformed so as to be represented by a coordinate system which best matches with the coordinate system selected on the other fingerprint.

The best match has been attained only with time consuming procedures. Even with the best match, the fingerprint matching has been unreliable due to various circumstances under which the fingerprints are printed. This has resulted in unsatisfactory performance of a conventional method of fingerprint matching and of a conventional fingerprint matching device. Incidentally, the position and direction data given either by the principal coordinate systems or by a coordinate system into which at least one of the coordinate systems is transformed to provide a certain degree of match, will be called original position and direction data in contrast to transformed position and direction data which are obtained after specific coordinate transformation.

SUMMARY OF THE INVENTION

It is an object of the present invention to provide a method of reliably matching a search fingerprint with each file fingerprint.

It is another object of this invention to provide a method of the type described, which rapidly carries out the matching.

It is a further object of this invention to provide a fingerprint matching device for use in carrying out the method of the type described.

A method according to this invention is for deciding a degree of match between a search and a file fingerprint. As is well known in the art, such a method includes the steps of selecting principal coordinate systems for the respective fingerprints, selecting a search and a file fingerprint area where minutiae are clear, forming a minutia list showing those original position and direction data of the minutiae and those relation data of the minutiae which are given by the respective principal coordinate systems and which are substantially independent of the principal coordinate systems, respectively, and selecting pairs of minutiae from the minutiae of the respective fingerprints by comparing the original position and direction data given for the respective fingerprints and furthermore comparing the relation data given for the respective fingerprints.

The method according to this invention is characterized by the steps of forming a pair candidate list which shows the above-mentioned pairs of minutiae as candidate pairs, respectively, deciding those optimum amounts by referring to the original position and direction data of the minutiae of the pair candidates which are for matching the principal coordinate systems with each other, transforming the original position and direction data given by one of the principal coordinate systems for the minutiae of the pair condidates into transformed position and direction data given by a transformed coordinate system into which the above-mentioned one principal coordinate system is transformed by the optimum amounts, forming a pair list by referring to the minutia list, the pair candidate list, and the search and the file fingerprint areas, which pair list shows precise pairs of minutiae selected from those minutiae of the pair condidates which are present in an area common to the search and the file fingerprint areas wherein the minutiae of each precise pair have a precise local similarity between the transformed position and direction data and the original position and direction data given by the other principal coordinate system and between the relation data and which pair list furthermore shows evaluations, each representative of the local similarity, and deciding the degree of match by using the minutiae of the precise pairs and by referring to the evaluations.

A fingerprint matching device according to this invention is for deciding a degree of match between a search and a file fingerprint. A conventional fingerprint matching device includes minutia list memory means for memorizing a minutia list showing those original position and direction data of minutiae which are given by principal coordinate systems prelminarily selected on the search and the file fingerprints, respectively, and those relation data of the minutiae which are substantially independent of the principal coordinate systems, fingerprint area memory means for memorizing a search and a file fingerprint area where the minutiae are clear, and selecting means coupled to the minutia list memory means for selecting pairs of minutiae from the minutiae of the respective fingerprints by comparing the original position and direction data given for the respective fingerprints and furthermore comparing the relation data given for the respective fingerprints.

The fingerprint matching device according to this invention is characterized by pair candidate list memory means coupled to the selecting means for memorizing a pair candidate list which shows the above-mentioned pairs of minutiae as pair candidates, respectively, optimum amount deciding means coupled to the minutia list memory means and the pair condidate list memory means for deciding those optimum amounts by referring to the original position and direction data of the minutiae of the pair candidates which are for matching the principal coordinate systems with each other, coordinate transforming means coupled to the minutia list memory means, the pair candidate list memory means, and the optimum amount deciding means for transforming one of the principal coordinate systems into a transformed coordinate system by the optimum amounts whereby the original position and direction data given by that one principal coordinate system are transformed into transformed position and direction data, pair list memory means coupled to the minutia list memory means, the pair candidate list memory means, and the fingerprint area memory means for memorizing a pair list which shows precise pairs of minutiae selected from those minutiae of the pair candidates which are present in an area common to the search and the file fingerprint areas wherein the minutiae of each precise pair have a precise local similarity between the transformed position and direction data and the original position and direction data given by the other principal coordinate system and between the relation data, which pair list furthermore shows evaluations, each representative of the local similarity, and deciding means coupled to the pair list memory means for deciding the degree of match by using the minutiae of the pair list and by referring to the evaluations.

BRIEF DESCRIPTION OF THE DRAWING

FIG. 9 shows a flow chart for use in describing a fingerprint matching method according to an embodiment of this invention;

FIG. 10 shows an example of a minutia list which is usually used in a fingerprint matching method or device;

FIG. 14, shows a leading part of a flow chart illustrative of operation of the proximate minutia recovery circuit depicted in FIG. 15;

FIG. 25 shows an example of the content of a composite minutia list used in the pair detection circuit illustrated in FIG. 24;

FIG. 26 shows an example of a pair candidate list memory used in the leading matcher illustrated in FIG. 6;

FIG. 28 shows a weight map formed in the adjustment amount deciding circuit exemplified in FIG. 27;

FIG. 30, drawn below FIG. 28, shows a factor table which is automatically taken into consideration by the adjustment amount deciding circuit shown in FIG. 27;

FIG. 31 shows another flow chart for use in describing the operation of the adjustment amount deciding circuit;

FIG. 32 shows still another flow chart for use in describing the operation of the adjustment amount deciding circuit;

FIG. 33 shows a set of several minutiae of a search and a file fingerprint;

FIG. 34 is a schematic diagram of a pair list memory for use in the precise matcher illustrated in FIG. 7;

FIG. 35 shows an example of the content of the pair list memory depicted in FIG. 34;

FIG. 36 shows another set of several minutiae;

FIG. 37 shows another example of the content of the pair list memory;

FIG. 38 shows two minutiae of a file fingerprint;

FIG. 20, shows examples of minutia pairs;

DESCRIPTION OF THE PREFERRED EMBODIMENTS

General Description

Figure 1:
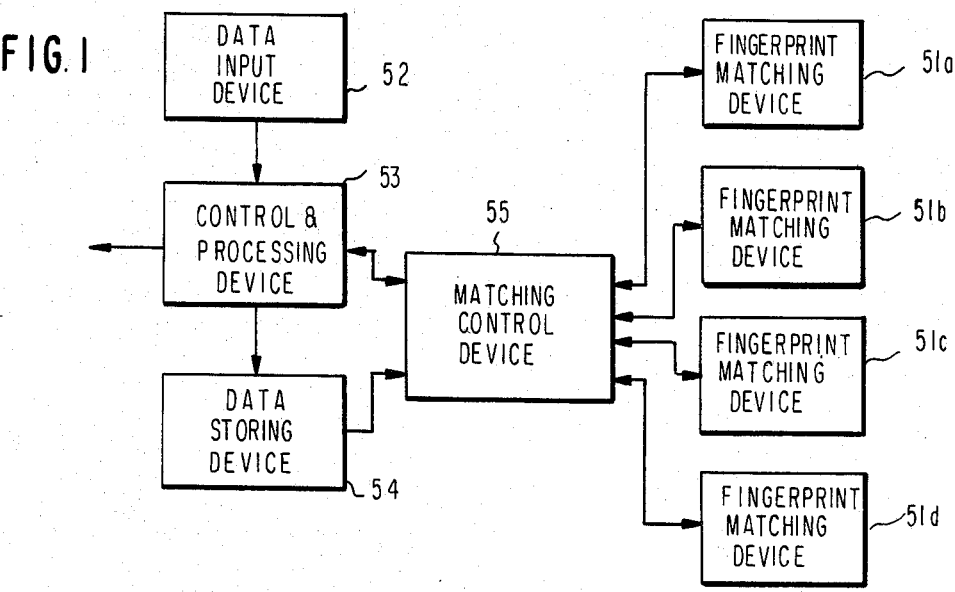
FIG. 1 is a block diagram of a fingerprint matching system.

Referring to FIG. 1, a fingerprint matching system comprises four fingerprint matching devices 51a, 51b, 51c, and 51d which have a common structure according to the present invention. The number of the devices 51 (the subscripts being omitted) need not necessarily be four. Only one device 51 may be used in the system. The system further comprises a data input device 52, a data control and processing device 53, a data storing device 54, and a matching control device 55, all of which will later be described in detail.

Figure 2:
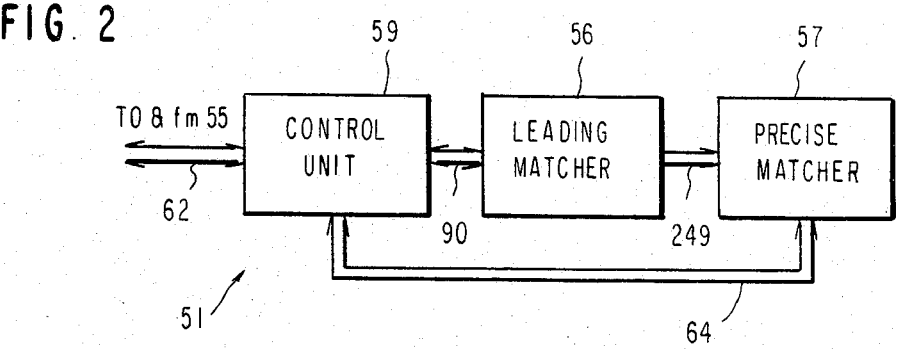
FIG. 2 is a block diagram of a fingerprint matching device for use in the system depicted in FIG. 1 according to the instant invention.

Turning to FIG. 2, each fingerprint matching device 51 comprises a leading matcher 56, a precise matcher 57, and a control unit 59, all of which will presently be described in outline and later in greater detail.

Figure 3:
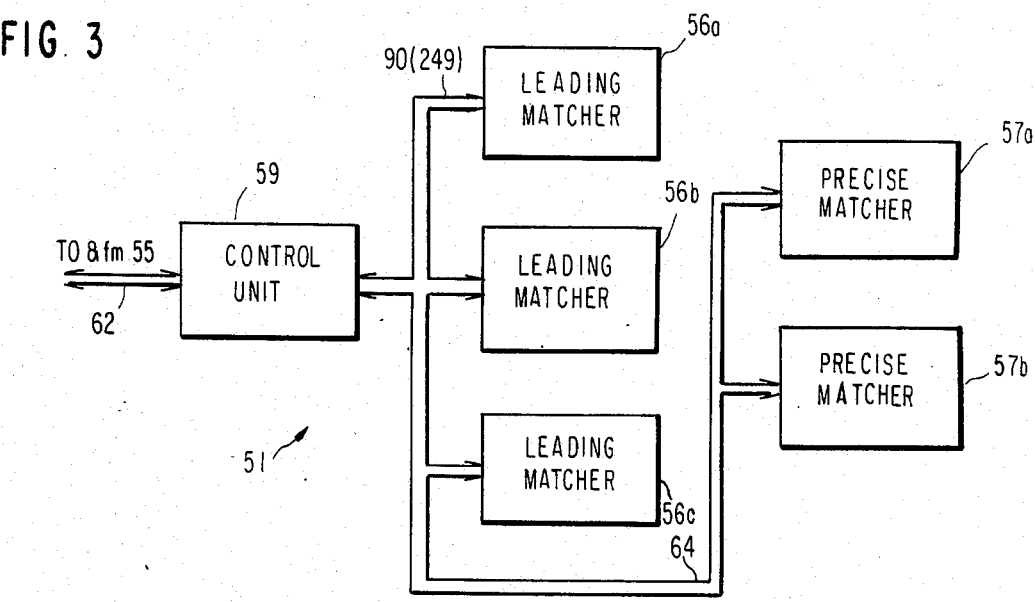
FIG. 3 is a block diagram of another fingerprint matching device for use in the system of FIG. 1, according to a more preferred embodiment of this invention.

As exemplified in FIG. 3, the fingerprint matching device 51 may comprise a plurality of leading matchers 56a, 56b, and 56c and a lesser number of precise matchers 57a and 57b.

In either event, the fingerprint matching device 51 is for deciding a degree of match q between a search and a file fingerprint by comparing data of the search fingerprint with data of a great number of file fingerprints. One, if any, of the file fingerprint is selected, that gives a best match with the search finerprint as regards the degree of match q. When a plurality of search fingerprints are given for matching, the device 51 repeats the comparison. Merely for brevity of description, it will be assumed that the device 51 compares data of only one search fingerprint with data of the file fingerprints unless otherwise stated. The data of the search and the file fingerprints will be identified by subscripts S and F.

Figure 4:
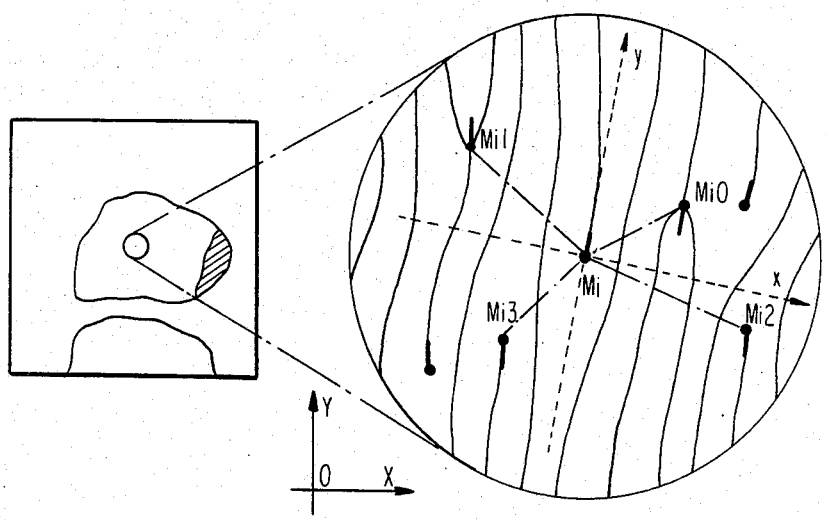
FIG. 4 diagrammatically shows a fingerprint.

Referring to FIG. 4, each fingerprint is a pattern or figure composed of ridges exemplified by thin lines in an area depicted on an enlarged scale. Some of the ridges have abrupt endings. Ridges that have or have not abrupt endings, may have bifurcations or branches. Furthermore, the ridges may have a singular point at which the ridge is irregular as, for example, very thick. The fingerprint may have a cross point of two or more ridges. The abrupt endings, the bifurcations, and so forth are called minutiae. The difference between the abrupt endings, the bifurcations, and the like is referred to as a difference between types of minutiae or minutia types. The fingerprint generally includes an unclear area or region indicated by a hatched area in which at least the minutiae are not clear. It is possible to select, as by excluding such unclear area or areas from the fingerprint, a search and a file fingerprint area where the minutiae are clear.

In order to quantitatively deal with the minutiae, an X-Y coordinate system is selected so as to have an origin O at, for example, a lowest one of the abrupt endings of a leftmost ridge extending towards the palm. The Y axis has the positive sense or direction towards the finger tip. The coordinate system will herein be called a principal coordinate system. Incidentally, it is possible in general to judge the direction of the finger tip from the directions in which the ridges flow or trail.

The minutiae are consecutively numbered with reference to the coordinate system. The minutia numbers will be denoted by $M_0, M_1, M_2, \ldots, M_i, \ldots, M_j, \ldots, M_z$, which denotation will be used also to represent the minutiae. It is to be noted in this connection that a natural number j need not always be greater than another natural number i but may either be equal to or less than the other natural number i. The last number z usually differs from a fingerprint to another. For example, a search fingerprint has less than sixty-four minutiae in general. A file fingerprint may have nearly one hundred and ninety-two minutiae.

The type of the i-th minutia $M_i$ will be designated by $Q_i$. Each minutia $M_i$ has a position or location given by coordinates $(X_i, Y_i)$ of the principal coordinate system. It is known in the art to define a direction with sense $D_i$ for each abrupt ending or bifurcation $M_i$ with reference to the principal coordinate system. As indicated by a short thick line, the direction of an abrupt ending is defined by the direction in which the ridge extends from the abrupt ending. The direction of a bifurcation is precisely defined in U.S. Pat. No. 4,310,827 issued to Koh Asai, one of the present applicants and assignor to the instant assignee.

A concentration or density C, is defined for each minutia $M_i$ by the number of other minutiae which are present in a prescribed area including the minutia $M_i$ being taken into consideration. The prescribed area is conveniently a circle having the center at the minutia $M_i$ under consideration and a predetermined radius. For the example depicted on the enlarged scale, the concentration $C_i$ is seven for the minutia $M_i$.

An x-y local coordinate system will be selected for each minutia $M_i$. The local coordinate system has a local origin at the minutia $M_i$. The y axis has the positive sense in coincidence with the minutia direction $D_i$. The x-y coordinate plane is divided into a predetermined number of sectors having a common vertex at the minutia $M_i$. A proximate minutia, if any, is selected in each sector. For the example being illustrated, the sectors are the first through the fourth quadrants of the local coordinate system. Minutiae $M_{i0}$, $M_{i1}$, $M_{i2}$, and $M_{i3}$ are representative of the proximate minutiae in the first, the second, the fourth, and the third quadrants, respectively. It should be noted that the double suffixes i0 through i3 are representative of pertinent one of 0 through the natural number z and that the suffix endings 0 through 3 are selected for the respective quadrants so as to simplify the circuitry of the fingerprint matching device 51 (FIGS. 1 through 3) as will later become clear. The proximate minutiae $M_{i0}$ through $M_{i3}$ will either singly or collectively be designated by $M_{ir}$. As the case may be, the i-th minutia $M_i$ used as the local origin, will be called a reference minutia in contrast to the proximate minutia or minutiae $M_{ir}$.

The number of ridges that lie between a reference minutia $M_i$ and each proximate minutia $M_{ir}$, is herein named a ridge count and denoted by $R_{ir}$. The ridge count $R_{ir}$ is what is called a relationship in the above-referenced Asai Patent and is different from the "ridge count" described in a reference cited in the Asai Patent. The illustrated minutia $M_i$ has ridge counts $R_{i0}$, $R_{i1}$, $R_{i2}$, and $R_{i3}$ which are equal to 1, 2, 4, and 1, respectively. In some cases, the ridge count $R_{ir}$ may be zero.

Figure 5:
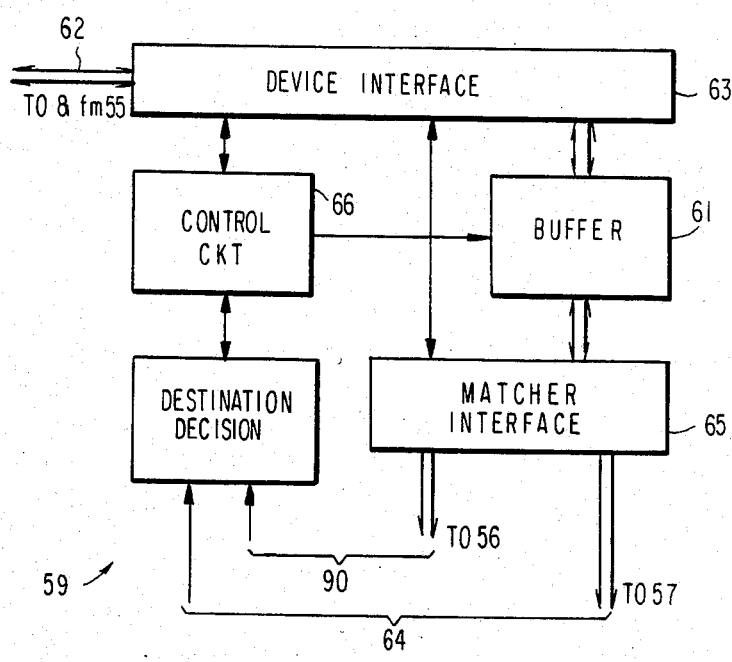
FIG. 5 is a block diagram of a control unit used in either of the devices illustrated in FIGS. 2 and 3.

Referring now to FIG. 5, the control unit 58 (FIGS. 2 and 3) comprises a buffer memory 61 which is loaded, as will become clear as the description proceeds, with data from the matching control unit 55 (FIG. 1) through a bus 62 and a device interface circuit 63 and furthermore with data from the precise matcher 57 or matchers 57's through a bus 64 and a matcher interface circuit 65. The buffer memory 61 is controlled by a control circuit 66. A destination deciding circuit 67 is for deciding the destination of the data in the manner to be later described.

Figure 6:
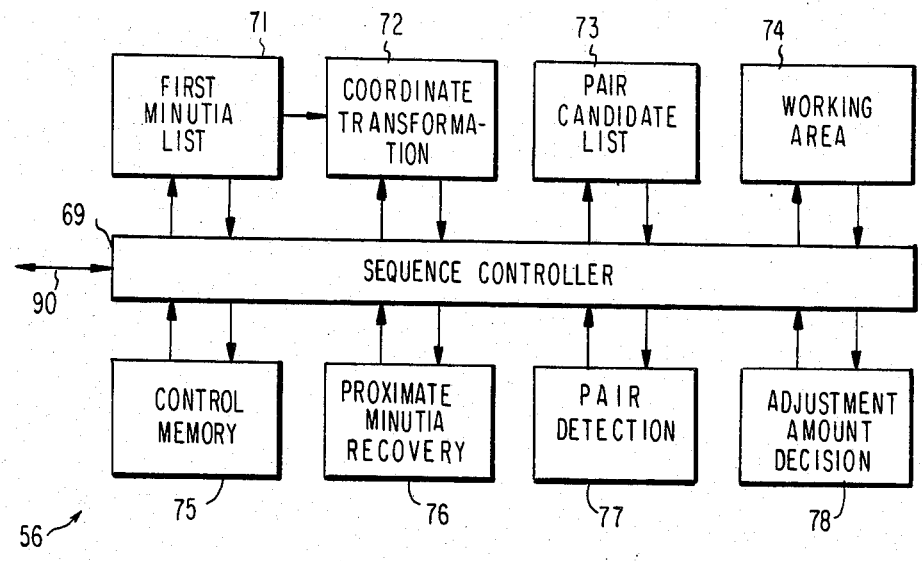
FIG. 6 is a block diagram of a leading matcher used in either of the devices shown in FIGS. 2 and 3.

Turning to FIG. 6, each leading matcher 56 (FIG. 2 or 3) comprises a sequence controller 69 connected, as will later become clear, to a first minutia list memory 71 directly and also through a coordinate transforming circuit 72, a pair candidate list memory 73, a working area 74, a control memory 75, a proximate minutia recovery circuit or relation calculating circuit 76, a pair detection circuit 77, and a (coordinate) adjustment amount deciding circuit 78. As will soon become clear, the minutia list memory 71 comprises search and file fingerprint memories 71S and 71F. The control memory 75 is preliminarily loaded with a microprogram (microcode) for use in controlling, among others, the adjustment amount deciding circuit 78 as will later be described in detail.

Figure 7:
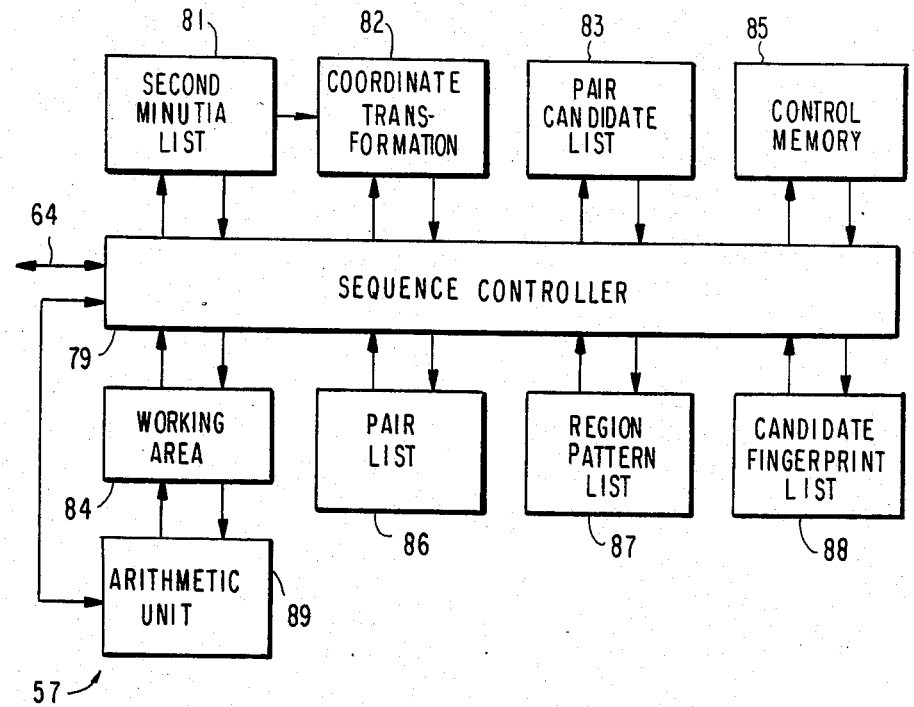
FIG. 7 is a block diagram of a precise matcher used in either of the devices depicted in FIGS. 2 and 3.

Further turning to FIG. 7, each precise matcher 57 (FIG. 2 or 3) comprises a sequence controller 79 connected, like in the leading matcher 56, to a second minutia list memory 81 directly and through a coordinate transforming circuit 82, a pair candidate list memory 83, a working area 84, a control memory 85, a pair list memory 86, a region pattern list memory 87, a candidate fingerprint list memory 88, and an arithmetic unit 89 which is connected also to the working area 84. The control memory 85 is for controlling the arithmetic unit 89.

A fingerprint matching device 51 according to preferred embodiments of this invention, will be described more in detail under the following subsections.
  (1) Read out of Minutia Data,
  (2) Coordinate Transformation,
  (3) Recovery of Proximate Minutiae,
  (4) Pair Detection,
  (5) Modifications of Pair Detection,
  (6) Pair Candidate List,
  (7) Amounts of Coordinate Adjustment,
  (8) Precise Matcher,
  (9) Fingerprint Matching, and
  (10) Destination Deciding Circuit.
A closing paragraph will be added to the description as an additional subsection (11).

Read out of Minutia Data

Figure 8:
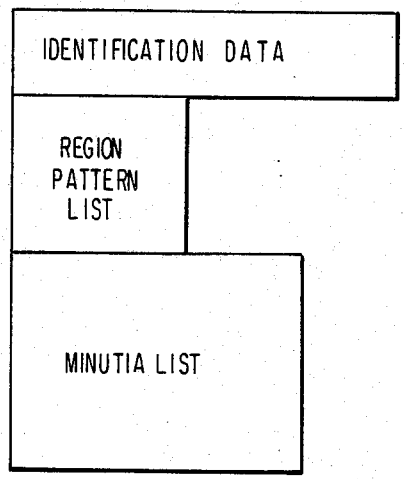
FIG. 8, drawn below FIG. 5 merely for convenience of illustration, shows minutia data which are generally used in fingerprint matching.

Referring to FIG. 8, data for each fingerprint are composed of identification or descriptive data, a region pattern list, and a (first) minutia list. The identification data of each file fingerprint consist of an identification number given to the file fingerprint, the name of the person who printed the fingerprint, male or female, the date of birth, the name of finger, the date and the locality of print, and the like. The identification data of each search fingerprint may comprise some of these. The region pattern and the minutia lists of a search fingerprint may be formed by the data input device 52 (FIG. 1) from the search fingerprint. The device revealed in the above-cited Asai Patent is effective for this purpose. The identification data and the region pattern and the minutia lists of a great number of file fingerprints may preliminarily be stored in the data input device 52. At any rate, the region pattern list gives the search and the file fingerprint areas by the principal coordinate system. The minutia list will shortly be described in detail.

Referring back to FIG. 1, data of the search fingerprint are transferred from the data input device 52 by the data control and processing device 53 to the data storing device 54 and stored therein. Also, data of the file fingerprints are successively stored in the data storing device 54 through the data control and processing device 53. On so transferring the data, the data control and processing device 53 may or may not edit the data. For example, the data control and processing device 53 may keep the identification data except the identification numbers, which are sent to the data storing device 54 for storage therein.

After storage of the data of the search and the file fingerprints in the data storing device 54, the data control and processing device 53 sends a command to the matching control device 55 through a bus to start the fingerprint matching. Before eventually supplied from the matching control device 55 through the bus with a result signal which represents the success or failure of the fingerprint matching, the data control and processing device 53 is free to deal with other jobs, such as transfer of the data of another search fingerprint from the data input device 52 to the data storing device 54. Incidentally, the result signal represents the degree of match q upon success of the fingerprint matching and at least the identification number of the file fingerprint best matched with the search fingerprint.

Referring to FIG. 9 in addition to FIGS. 1 through 6 and 8, a first step $A_1$ of the fingerprint matching is to read out the data of the search and the file fingerprints from the data storing device 54 by the matching control device 55 in response to the command. At the outset, the data of the search fingerprint are read out and delivered to the fingerprint matching devices 51's. In each fingerprint matching device 51, the data of the search fingerprint are supplied to the leading matcher 54 (FIG. 2) or matchers 56's (FIG. 3) through the control unit 59 and a bus 90 (also in FIG. 5) and stored in the search minutia list memory 71S of every leading matcher 56 through the sequence controller 69.

Subsequently, the matching control device 55 delivers the data of one of the file fingerprints to one of the free leading matchers 56 of the fingerprint matching devices 51 in the manner which will later be exemplified in connection with the destination deciding circuit 67 (FIG. 5). In the free one of the leading matchers 56 the data are stored in the file minutia list memory 71F. If there are other free leading matchers 56, the matching control device 55 feeds the data of other file fingerprints thereto.

The fingerprint matching system comprising a plurality of fingerprint matching devices 51 as exemplified in FIG. 1, is therefore capable of substantially concurrently matching the data of a search fingerprint with the data of a plurality of file fingerprints. Operation will, however, be described in the following as regards the data of only one file fingerprint unless otherwise stated.

Turning to FIG. 10, the first minutia list memory 71 (FIG. 6, 71S or 71F) comprises a plurality of memory sections having row addresses which can be specified by a row address signal indicative of a minutia number $M_i$ at a time. Each memory sector has a plurality of memory fields having column addresses which can be indicated by a column address signal as will become clear as the description proceeds. Incidentally, the minutia memory 71 may temporarily store the identification numbers and the region pattern lists of the search and the file fingerprints.

According to one of the preferred embodiments of this invention, the memory fields of a memory sector accessible by the minutia number $M_i$, comprises a first field for the minutia type $Q_i$, a second field for the position and the direction data $X_i$, $Y_i$, and $D_i$, a third field for the concentration $C_i$, and a fourth field for the ridge counts $R_{i0}$ through $R_{i3}$ or $R_{ir}$. In the first field an end mark is stored in the memory sector which next follows the memory sector for the last-numbered minutia $M_z$.

Coordinate Transformation

Inasmuch as the search and the file fingerprints are printed under different circumstances, it is necessary on matching the search fingerprint with the file fingerprint to subject the minutia list of at least one of the search and the file fingerprints to a certain modification.

By way of example, different first and second principal coordinate systems are used in general on describing the minutia positions and directions of the search and the file fingerprints, respectively. The first (principal) coordinate system must be subjected to forward (coordinate) transformation to be a new principal coordinate system that gives a best match with the second coordinate system and will be referred to as a "central" coordinate system merely for convenience of discrimination. Incidentally, it is convenient to subject the first coordinate system to the coordinate transformation rather than the second coordinate system because of a generally much less number of the minutiae.

The region pattern list of the search fingerprint, however, need not be forwardly transformed as will later become clear. During comparison of the minutia lists between the search and the file fingerprints, the position data represented by the central coordinate system must therefore be subjected to back (coordinate) transformation for comparison with the region pattern list.

As will soon become clear, such coordinate transformation is necessary in a great number of cases.

Figure 11:
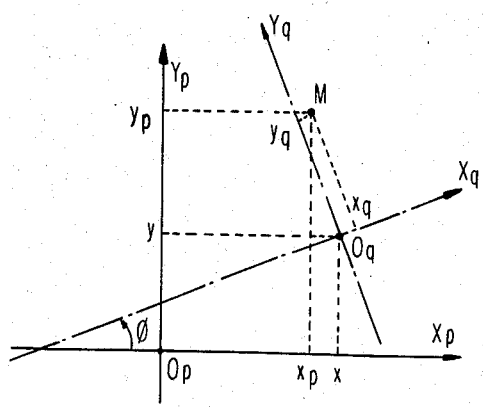
FIG. 11 shows coordinate systems for use in describing coordinate transformation in general.

Referring to FIG. 11, the principal coordinate system has a principal origin $O_p$ and principal X and Y axes $X_p$ and $Y_p$. The central coordinate system has a central origin $O_q$ and central X and Y axes $X_q$ and $Y_q$. It will be presumed merely foor simplicity of description that each coordinate system is a right-hand orthogonal coordinate system.

The central origin $O_q$ has coordinates (x, y) according to the principal coordinate system. The central X axis $X_q$ is counterclockwise rotated by an angle of rotation $\phi$ from the principal X axis $X_p$. In other words, the forward transformation is to translate the principal origin $O_p$ by translation components x and y and to rotate the principal coordinate plane by the angle of rotation $\phi$.

Central coordinates $(x_q, y_q)$ of a point M are related to principal coordinates $(x_p, y_p)$ of the point M by:

$$x_q = (x_p - x) \cos \phi + (y_p - y) \sin \phi \qquad (1)$$

and $$y_q = (y_p - y) \cos \phi - (x_p - x) \sin \phi. \qquad (2)$$

Figure 12:
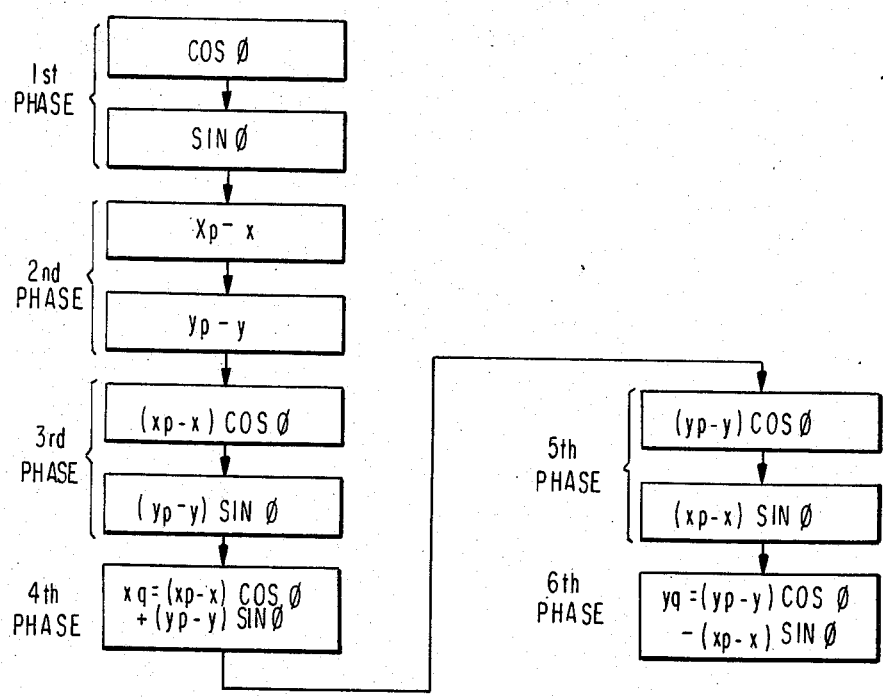
FIG. 12 shows a flow chart for use in describing general coordinate transformation.

Turning to FIG. 12, a first phase of the forward transformation is to calculate values cos $\phi$ and sin $\phi$ of the trigonometric or circular function. A second phase is to calculate first and second differences $(x_p - x)$ and $(y_p - y)$. A third phase is to calculate first and second products $(x_p - x) \cos \phi$ and $(y_p - y) \sin \phi$. A fourth phase is to calculate an ultimate sum according to Equation (1). A fifth phase is to calculate third and fourth products $(y_p - y) \cos \phi$ and $(x_p - x) \sin \phi$. A sixth phase is to calculate an ultimate difference in compliance with Equation (2). It is possible to simultaneously carry out the third and the fifth phases and also the fourth and the sixth phases.

Incidentally, the backward transformation is carried out in accordance with:

$$x_p = x_q \cos \phi - y_q \sin \phi + x \qquad (3)$$

and $$y_p = y_q \cos \phi + x_q \sin \phi + y. \qquad (4)$$

The forward and backward transformation has been carried out by the use of software, which is not suited to rapid processing. In particular, a complicated electronic digital computer is indispensable on carrying out the first phase and the third and the fifth phases.

Figure 13:
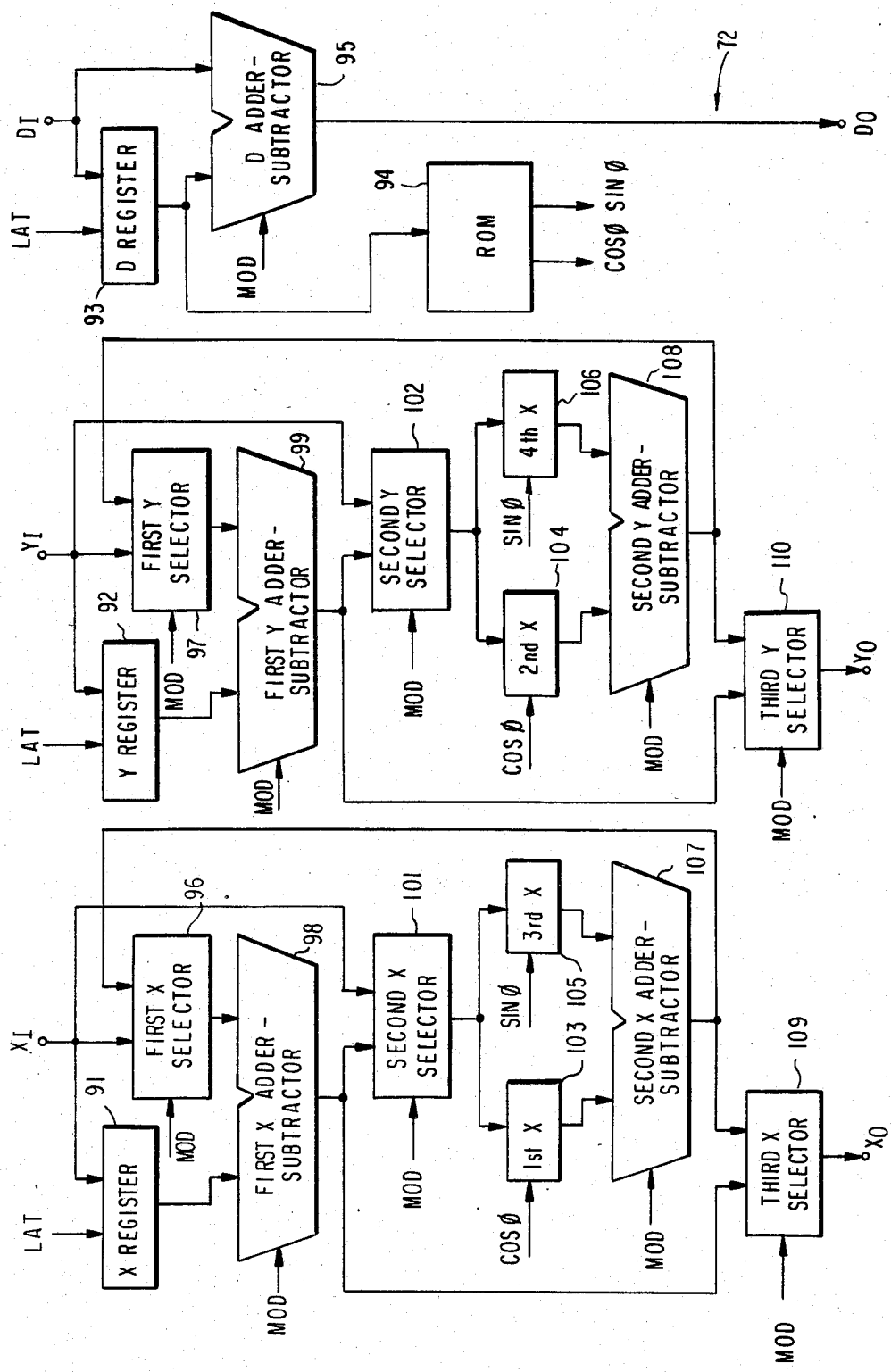
FIG. 13 is a block diagram of a coordinate transforming circuit which is preferred for use in a fingerprint matching device according to an aspect of this invention.

Referring now to FIG. 13, an example of the coordinate transforming circuit 72 (FIG. 6) is for rapidly carrying out the forward and the backward transformation with simple circuitry. As will later be described, a mode signal MOD is supplied from the sequence controller 69. The mode signal MOD indicates the forward and the backward transformation by, for example, binary zero and one, respectively.

As will also be described in the following, X, Y, and D input terminals $X_I$, $Y_I$, and $D_I$ are supplied at first with initial data consisting of the translation components x and y and the angle of rotation $\phi$. When a latch pulse LAT is supplied from the sequence controller 69, the initial data are stored in X, Y, and D registers 91, 92, and 93. The latch pulse LAT is soon switched off.

The angle of rotation $\phi$ stored in the D register 93 is delivered to a ROM 94 as an address signal and to a D adder-subtractor 95 for the purpose which will shortly be described. Values of the trigonometric function are preliminarily stored in the ROM 94 for various values of the angle of rotation $\phi$. Accessed by the address signal, the ROM 94 produces the values cos $\phi$ and sin $\phi$ to carry out the first phase (FIG. 12). Incidentally, each angle $\phi$ may be given a binary number having up to eight bits. Each value cos $\phi$ or sin $\phi$ may be represented by a binary number of ten bits.

On carrying out the forward transformation, the input terminals $X_I$, $Y_I$, and $D_I$ are supplied with the principal position data $x_p$ and $y_p$ and a principal direction datum $d_p$ from the minutia list memory 71 (FIG. 6) as will soon be described. Responsive to the mode signal MOD indicative of the forward transformation, first X and Y selectors 96 and 97 select the input data fed directly thereto from the input terminals $X_I$ and $Y_I$ to deliver the principal coordinates $x_p$ and $y_p$ to first X and Y adder-subtractors 98 and 99. Controlled by the mode signal MOD, the adder-subtractors 98 and 99 calculate the first and the second differences to carry out the second phase. Controlled also by the mode signal MOD, second X and Y selectors 101 and 102 feed the differences to first and second multipliers 103 and 104, which calculate the first and the second products to carry out the third phase. The second X and Y selectors 101 and 102 furthermore deliver the differences to third and fourth multipliers 105 and 106, which calculate the third and the fourth products according to the fifth phase.

Responsive to the mode signal MOD, second X and Y adder-subtractors 107 and 108 calculate the ultimate sum and difference to carry out the fourth and the sixth phases, respectively. Third X and Y selectors 109 and 110 are controlled by the mode signal MOD to feed the ultimate sum and difference to X and Y output terminals $X_0$ and $Y_0$ as the central coordinates $x_q$ and $y_q$. The D adder-subtractor 95 calculates a difference $(d_p - \phi)$ and delivers the difference to a D output terminal $D_0$ as a central direction datum $d_q$.

For the backward transformation, the mode signal MOD is made to indicate the same. The input terminals $X_I$, $Y_I$, and $D_I$ are supplied at first with the initial data, which are stored in the registers 91 through 93 by the latch pulse LAT. It is possible to make the registers 91 through 93 keep the initial data stored therein before beginning of the forward transformation.

At any rate, the input terminals $X_I$, $Y_I$, and $D_I$ are now supplied with the central position and direction data $x_q$, $y_q$, and $d_p$. Responsive to the mode signal MOD indicative of the backward transformation, the second X and Y selectors 101 and 102 select the input data delivered thereto directly from the X and Y input terminals $X_I$ and $Y_I$ to feed the central coordinates $x_q$ and $y_q$ to the first and second multipliers 103 and 104, respectively, and also to the third and the fourth multipliers 105 and 106. The first and the second multipliers 103 and 104 calculate the products used in Equation (3) and the third and the fourth multipliers 105 and 106, the products used in Equation (4).

Responsive to the mode signal MOD, the second X and Y adder-subtractors 107 and 108 calculate a difference and a sum of the products according to Equations (3) and (4), respectively. The first X and Y selectors 96 and 97 now select the input data fed thereto from the second X and Y adder-subtractors 107 and 108 to deliver the difference and the sum to the first X and Y adder-subtractors 98 and 99, which calculate the right-hand side of Equations (3) and (4), respectively.

Controlled by the mode signal MOD, the third X and Y selectors 109 and 110 select the input data supplied thereto from the first X and Y adder-subtractors 98 and 99 to deliver the principal coordinates $x_p$ and $y_p$ to the X and the Y output terminals $X_0$ and $Y_0$. The D adder-subtractor 95 sums the central direction datum $d_q$ and the angle of rotation $\phi$ to feed the principal direction datum $d_q$ to the D output terminal $D_0$.

It may be helpful depending on the circumstances to refer to the central coordinate system again as a first principal coordinate system. Alternatively, the central coordinate system and the second principal coordinate system will be referred to as preliminarily matched coordinate systems when used in the pair detection which is already mentioned above as one of the subsections and will later be described in detail As will become clear as the description proceeds, the coordinate transforming circuit being illustrated, is capable of carrying out forward and backward transformation between the principal coordinate system and a local coordinate system. When used in the leading matcher 56 (FIG. 6), the coordinate transforming circuit 72 need not carry out the backward transformation. On the other hand, the coordinate transformation circuit 82 (FIG. 7) need not carry out the forward transformation. The coordinate transforming circuits 72 and 82 therefore need not comprise the selectors 96, 97, 101, 102, 109, and 110. The sequence controllers 69 and 79 need not produce the mode signal MOD. The circuitry illustrated with reference to FIG. 13 is useful when a single minutia list memory is used in place of the first and the second minutia memories 71 and 81 in storing the minutia list referred to hereinabove as the first minutia list. Use of the first and the second minutia list memories 71 and 81 is preferred because provision of the leading and the precise matchers 56 and 57 is thereby enabled and because the second minutia list memory 81 need not have a large memory capicity as will later become clear.

Recovery of Proximate Minutiae

Figure 14:
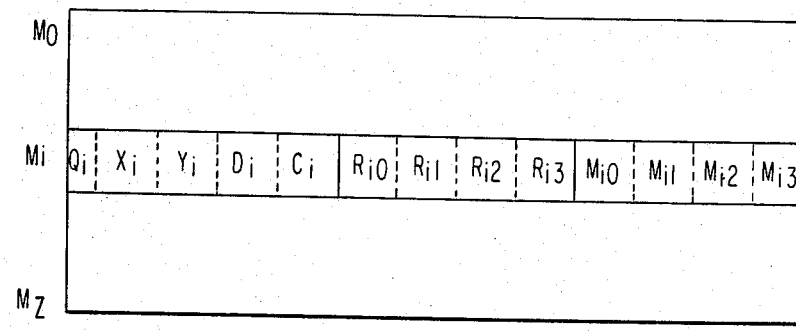
FIG. 14 shows another example of the minutia list.

Referring to FIG. 14, a memory sector for the i-th minutia $M_i$ in the search and the file minutia list memories 71S and 71F of the first minutia list memory 71 (FIG. 6) may comprise first through eighth fields accessible by the column address signal. The fifth through the eighth fields are for storing the proximate minutia numbers $M_{ir}$, namely, the numbers given to the proximate minutiae $M_{ir}$. Recovery of the proximate minutiae $M_{ir}$ is unnecessary in this event. The recovery is necessary as shown at a second step $A_2$ in FIG. 9 when the minutia list memory 71 is loaded with the minutia list in compliance with FIG. 10 in order to reduce the memory capacities of various memories used in the fingerprint matching system (FIG. 1).

Speaking more in general, it is necessary on matching two fingerprints to compare a local feature of a minutia $M_{iS}$ of the search fingerprint with a corresponding local feature of a minutia $M_{jF}$ of the file fingerprint. The local features should preferably be independent of selection of the principal coordinate systems for the respective fingerprints. Examples of such local features are the minutia types $Q_{iS}$ and $Q_{jF}$ and the concentrations $C_{iS}$ and $C_{jF}$. On defining the concentration, it is possible to use instead of a single prescribed area a plurality of prescribed areas for each reference minutia, such as the sectors described earlier in connection with the ridge counts $R_{ir}$.

The ridge counts $R_{irS}$ and $R_{jrF}$ are also useful as the local feature. Discussion will, however, later be given to the ridge counts $R_{ir}$.

It has now been confirmed that another local feature is effective on carrying out the comparison. The other local feature is a distance between the reference minutia $M_i$ and each proximate minutia $M_{ir}$.

More specifically, the distance is conveniently calculated by the use of the local coordinate system described in conjunction with FIG. 4. The distances for corresponding proximate minutiae, such as $M_{i0S}$ and $M_{j0F}$, are used in evaluating a local similarity between the minutiae $M_{iS}$ and $M_{jF}$ under consideration. When a difference between such distances is less than a predetermined threshold, the local similarity between the minutiae $M_{iS}$ and $M_{jF}$ is given a mark 1. If the differences for the respective proximate minutiae $M_{ir}$ in four quadrants are all less than the threshold, the local similarity is given a full mark 4.

As thus far been described, the ridge counts, the concentration or concentrations, the distances, and/or the like are calculated for each minutia with reference to a local coordinate system having a local origin at the minutia under consideration. These data will be referred to as relation data, which are substantially independent of the principal coordinate system and are helpful in founding a local similarity between a reference minutia of the search fingerprint and a reference minutia in the file fingerprint.

Calculation or evaluation of the local similarity will be called relation evalution. The relation evalution must be carried out rapidly and yet with a high reliability because each search fingerprint must be compared with an enormous number of file fingerprints. The relation evaluation is also used in recovery of the proximate minutiae.

Figure 16A:
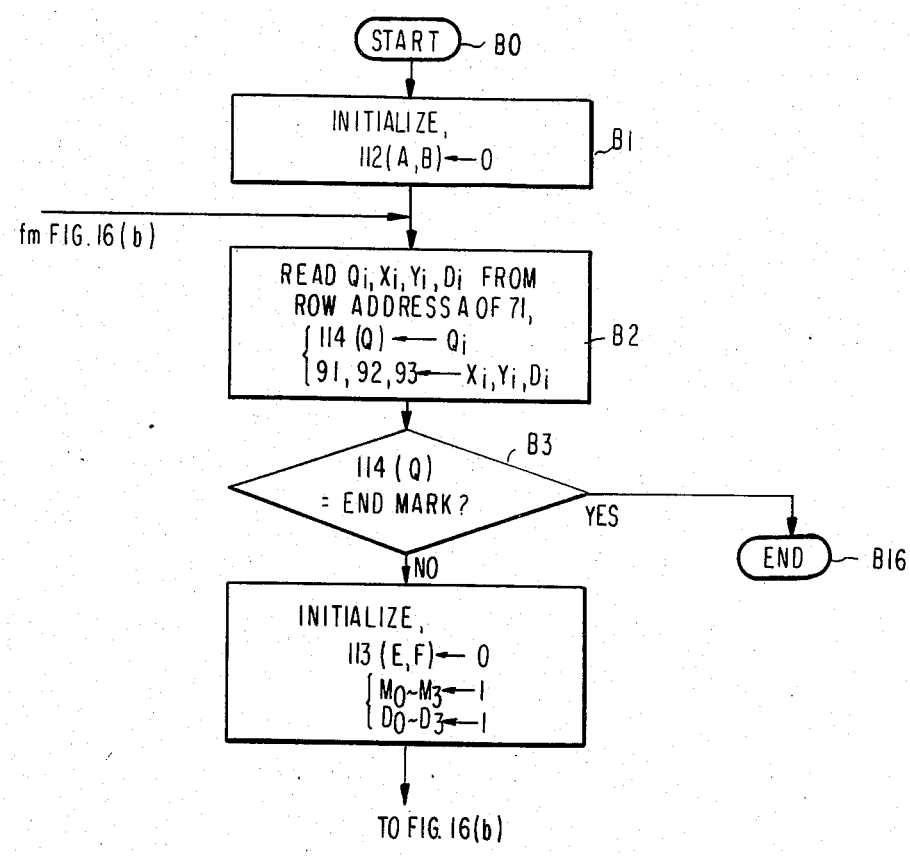
FIG. 16(a), drawn below
Figure 15:
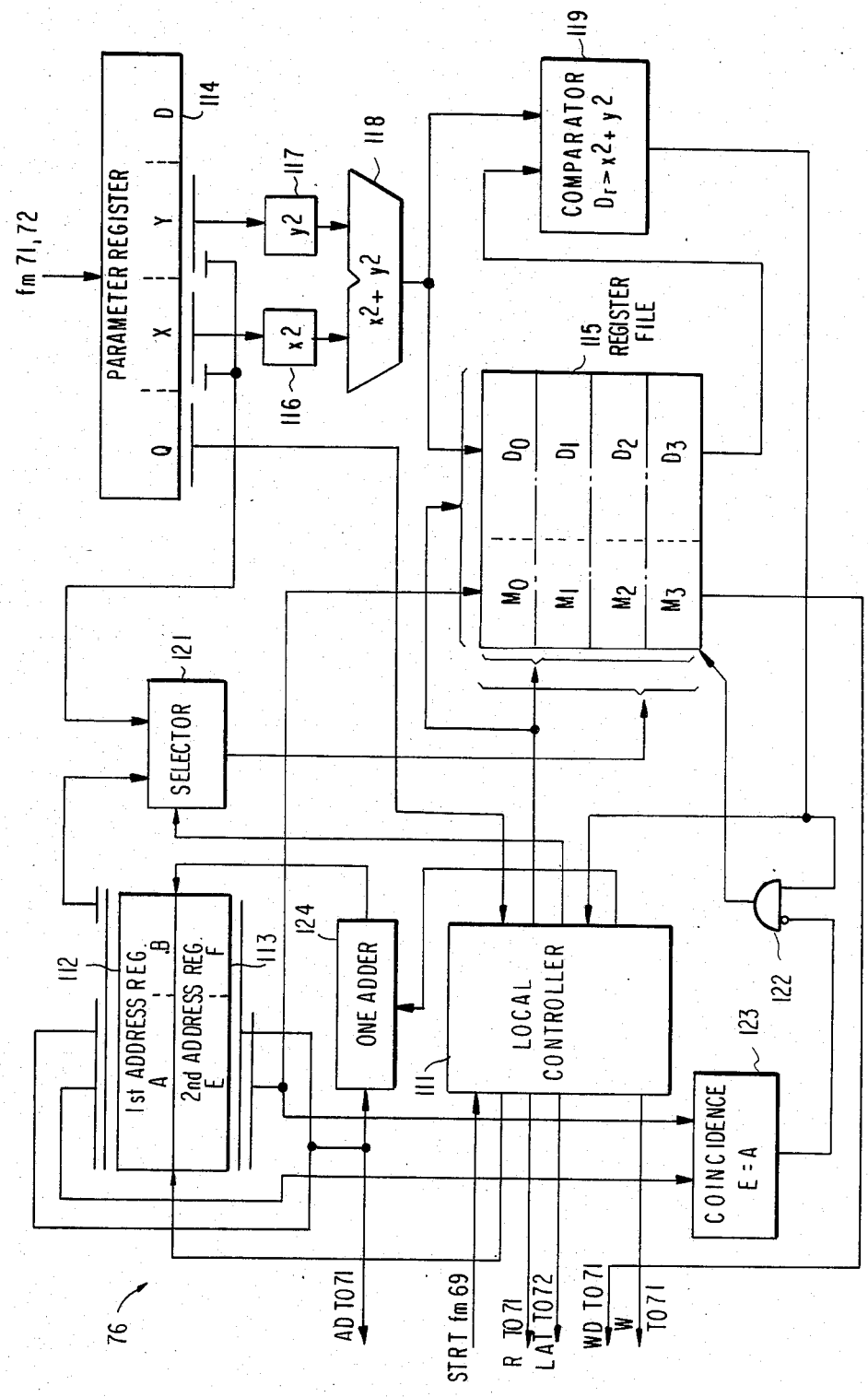
FIG. 15 is a block diagram of a proximate minutia recovery circuit for use in the leading matcher illustrated in FIG. 6.
Figure 16B:
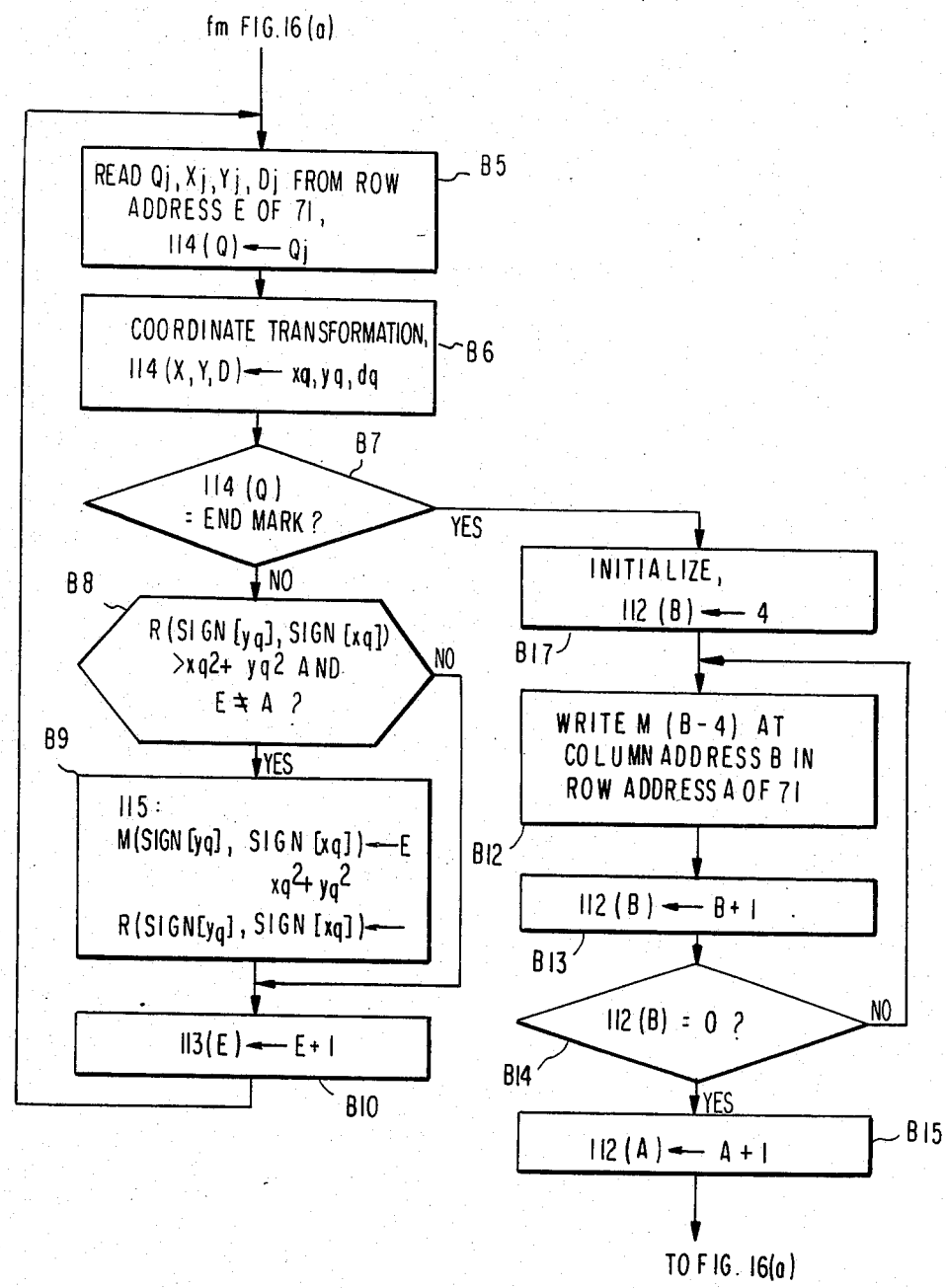
FIG. 16(b) shows the remaining part of the flow chart.

Referring to FIGS. 15 and 16, an example of the proximate minutia recovery circuit 76 (FIG. 6) comprises a local controller 111 operable according to a microprogram stored therein. Start of the distance calculation is indicated by a start signal STRT from the sequence controller 69 as shown at a zeroth step $B_0$ (FIG. 16).

In compliance with the microprogram, the local controller 111 sets an initial value of zero in each of first and second fields A and B of a first address register 112 at a first step $B_1$. The address register 112 is for producing a composite address signal AD for specifying the row and the column addresses in one of the search and the file minutia list memories 71S and 71F at a time that may be selected by a read signal R according to the microprogram. Incidentally, a second address register 113 is for similarly accessing the same minutia list memory 71 (71S or 71F) by a like address signal, designated also by AD, and has first and second fields which will be denoted by E and F. The first fields A and E are for producing the row address signals representative of the minutia numbers $M_i$ and $M_j$. The second fields B and F are for likewise producing the column address signals for either the same field or different fields.

When zero is set in the second fields B and F and moreover when the i-th minutia $M_i$ is concurrently specified by the row address signals produced from the first fields A and E, the minutia list memory 71 produces the minutia type $Q_i$ from the first field. It will now be assumed that the address signals AD are for the search minutia list memory 71S and that the zero column address signal accesses also the second field.

As indicated at a second step $B_2$, the controller 111 makes the first address register 112 produce the address signal AD. The minutia type $Q_{0S}$ thereby read out, is set in a Q field of a parameter register 114. The other data $X_{0S}$, $Y_{0S}$, and $D_{0S}$ are delivered to the X, Y, and D registers 91 through 93 (FIG. 13). Immediately thereafter, the sequence controller 69 is made to produce the latch pulse LAT (FIG. 13) and the mode signal MOD indicative of the forward transformation. The position data $X_0$ and $Y_0$ (the suffix S being omitted for a short while) provide the translation components x and y described in connection with FIG. 13. The direction datum $D_0$ provides the angle of rotation $\phi$.

Inasmuch as the mode signal MOD in unccessary for the coordinate transforming circuit 72 (FIG. 6), the latch pulse LAT is produced by the local controller 111 rather than by the sequence controller 69 in the example being illustrated. It will now be surmised for brevity of description that the position and the direction data $X_i$, $Y_i$, and $D_i$ are read from the search minutia list memory 71S.

At a third step $B_3$, the controller 111 checks whether or not the minutia type $Q_i$ stored in the Q field is the end mark. If not, the controller 111 sets the initial value of zero in each of the fields E and F of the second address register 113 and another initial value of one in each of address fields $M_0$, $M_1$, $M_2$, and $M_3$ and distance fields $D_0$, $D_1$, $D_2$, and $D_3$ of a register file 115 as shown at a fourth step $B_4$. The correspondingly numbered address and distance fields, such as $M_0$ and $D_0$, are two fields of a partial register of the register file 115. As will presently become clear, the address fields $M_r$ are eventually loaded with the proximate minutia numbers $M_{ir}$ which are present in the first, the second, the fourth, and the third quadrants for the i-th minutia $M_i$ being dealt with and used as the reference minutia. The initial value of one set in the address fields $M_r$ and in the distance fields $D_r$ indicate that there is no proximate minutiae in the respective quadrants and that the distance between the reference minutia $M_i$ and a minutia in the corresponding quadrant is infinitely long.

As shown at a fifth step $B_5$, the controller 111 makes the second address register 113 produce the address signals AD representative of the contents of the fields E and F. The row address thereby specified, is for the zeroth minutia $M_0$. It will, however, be presumed like for the address signal AD produced from the first address register 112 that the row address for the j-th minutia $M_j$ is indicated by the row address signal produced by the first field E of the second address register 113.

The Q field of the parameter register 114 is rewritten into the minutia type $Q_j$. The other data $X_j$, $Y_j$, and $D_j$ are supplied to the X, Y, and D adder-subtractors 98, 99, and 95 (FIG. 13) as the principal data $x_p$, $y_p$, and $d_p$. At a sixth step $B_6$, the forward transformation is automatically carried out. The local (coordinate) data $x_q$, $y_q$, and $d_q$ are stored in X, Y, and D fields of the parameter register 114 at a seventh step $B_7$.

The local position data $x_q$ and $y_q$ retained in the X and Y fields of the parameter register 114 are delivered to X and Y square calculators 116 and 117, respectively. Squares thereby calculated, are fed to an adder 118. The square of the distance between the i-th minutia $M_i$ under consideration and the j-th minutia $M_j$ being selected, is supplied to one of the two input ports of a comparator 119.

In the meantime, a permutation of the sign bits of the local position data $y_q$ and $x_q$ stored in the Y and X fields of the parameter register 114, is delivered towards a selector 121 to represent a two-digit binary number. The binary number indicates that the j-th minutia $M_j$ is present in one of the quadrants that is decided as follows. If the binary number is 00 or decimal 0, the j-th minutia $M_j$ is in the first quadrant. If the binary number is equal to 01, 11, and 10, namely, decimal 1, 3, and 2, the j-th minutia $M_j$ is in the section through the fourth quadrants, respectively.

Unless the minutia type $Q_j$ kept in the Q field of the parameter register 114 shows the end mark, the controller 111 sends a selection signal to the selector 121 to make the same supply the sign bit permunation to the register file 115 as an address signal for accessing the partial register having the address field $M_r$ that is allotted to the quadrant indicated by the sign bit permutation. The content of the distance field $D_r$ of the accessed partial register is supplied to the other input port of the comparator 119.

As collectively shown at an eighth step $B_8$, the comparator 119 compares the sum $(x_q^2 + y_q^2)$ with the distance $D(\text{sign}[y_q], \text{sign}[x_q])$ read out of the distance field $D_r$ of the accessed partial register. If the former is less than the latter, the j-th minutae $M_j$ is nearer to the i-th minutia $M_i$ than another minutia which is previously dealt with to provide the distance being read out. The comparator 119 informs the controller 111 of the fact by, for example, a binary one signal.

Meanwhile, contents of the first fields A and E of the address registers 112 and 113 are supplied to a coincidence detector 122. When the contents are the same, the coincidence detector 112 produces a coincidence signal of logic one. That is, the logic one coincidence signal is produced when the j-th minutia $M_j$ is not different from the i-th minutia $M_i$. The coincidence signal is fed to an inhibit port of an inhibit gate 123 to inhibit the binary one signal delivered thereto from the comparator 119.

In the meanwhile, the content of the first field E of the second address register 113 is delivered to the address fields $M_r$ of the register file 115. Furthermore, the sum calculated by the adder 119 is supplied towards the distance fields $D_r$. When the coincidence signal is logic zero to indicate that the j-th minutia $M_j$ is different from the i-th minutia $M_i$ and consequently in one of the quadrants except the local origin $M_i$, the inhibit gate 123 supplies the binary one signal to the register file 115 as a write-in signal. At a ninth step $B_9$, the contents of the address and the distance fields $M_r$ and $D_r$ of one of the partial registers that is accessed by the sign bit permutation supplied thereto through the selector 121, are renewed to the content of the first field E of the second address register 113 (the minutia number of the j-th minutia $M_j$) and to the sum (square of the distance between the minutiae $M_i$ and $M_j$).

Either if the sum is not less than the previously calculated sum or if the j-th minutia $M_j$ is in fact the i-th minutia $M_i$, the eighth step $B_8$ jumps to a tenth step $B_{10}$ where the controller 111 makes a one-adder 124 add one to the content of the E field of the second address register 113. When the sum is less than the previously calculated sum and furthermore when the j-th minutia $M_j$ is different from the i-th minutia $M_i$, the above-described ninth step $B_9$ is followed by the tenth step $B_{10}$. The contents of the register file 115 are thus renewed whenever a nearer minutia is found in a certain one of the quadrants.

By so repeating either the steps $B_5$ and $B_{10}$ or the steps $B_5$ through $B_8$ and $B_{10}$ with the ninth step $B_9$ skipped, the controller 111 renews the contents of the register file 115. Recovery of the proximate minutiae $M_{ir}$ for the i-th minutia $M_i$ ends when the end mark is eventually detected at the seventh step $B_7$. At this instant, the proximate minutia numbers $M_{ir}$ are Kept in the respective address fields $M_r$. If no proximate minutia is found in a certain one of the quadrants, the initial value of one is held in the address field $M_r$ allotted to that quadrant.

The process now proceeds to transfer of the proximate minutiae $M_{ir}$ of the i-th minutia $M_i$. In the example being illustrated, the transfer is carried out to that one of the search and the file minutia list memories 71 (71S and 71F) from which the i-th minutia $M_i$ is read. As a result of the transfer, contents of the memory sector for the i-th minutia $M_i$ are changed from those exemplified in FIG. 10 to those exemplified in FIG. 14.

It will now be assumed merely for convenience of description that the column address of the fifth field (FIG. 14) for the minutia number $M_{i0}$ is decimal 4 or binary 100. At an eleventh step $B_{11}$, the local controller 111 initializes the content of the second field B of the first address register 112 to 4. Two consecutive less significant bits of the second field B are supplied to the selector 121, which are now 00 out of the binary 100 and correspond to the address signal used in accessing the partial register ($M_0$ and $D_0$) assigned in the register file 115 to the first quadrant. As a part of the composite address signal AD, the second field B produces the column address signal for the fifth field. The row address signal produced from the first field A as another part of the address signal AD, still specifies the row address for the i-th minutia $M_i$ in the minutia list memory 71 in question. Concurrently with the eleventh step $B_{11}$, the controller 111 makes the selector 121 select the two less significant bits.

The register file 115 produces the content of the accessed address field $M_0$ as a data signal WD, which is delivered towards the minutia list memory 71 under consideration. The controller 111 supplies a write-in signal W to the minutia list memory 71. The minutia number $M_{i0}$ is therefore pertinently written in the minutia list memory 71 at a twelfth step $B_{12}$.

At a thirteenth step $B_{13}$, the controller 111 makes the one-adder 124 add one to the content of the second field B. The content specifies the column address for the proximate minutia $M_{i1}$. The two less significant bits designates the second quadrant.

At a fourteenth step $B_{14}$, the controller 111 checks the content of the second field B whether or not overflow results from the addition of one to render the content equal to decimal 0. If not, the process returns from the fourteenth step $B_{14}$ to the twelfth step $B_{12}$.

Repeating the steps $B_{12}$ through $B_{14}$, the controller 111 transfers the proximate minutia numbers $M_{ir}$ to the minutia ist memory 71 being dealt with. When the overflow is detected at the fourteenth step $B_{14}$, the controller 111 makes the one-adder 124 add one to the content of the first field A at a fifteenth step $B_{15}$. The row address for the (i+1)-th minutia is now specified. The process returns from the fifteenth step $B_{15}$ to the second step $B_2$.

In this manner, the proximate minutiae, if any, are recovered successively for the minutiae $M_0$, $M_1$, ..., $M_i$, ..., and $M_z$ and stored in the minutia list memory 71 in question. After the proximate minutia number $M_{z3}$ is eventually stored in the minutia list memory 71, the content of the first field A of the first address register 112 becomes equal to (z+1) at the fifteenth step $B_{15}$. The end mark is now stored in the Q field of the parameter register 114. When the controller 111 detects the end mark at the third step $B_3$, the recovery of the proximate minutiae comes to an end as shown at a sixteenth step $B_{16}$.

Pair Detection

For each minutia $M_i$, the minutia type $Q_i$, the position and the direction data $X_i$, $Y_i$, and $D_i$, and the like will now be called minutia data of the minutia $M_i$. The proximate minutia numbers $M_{ir}$ and the ridge counts $R_{ir}$ will be named fundamental relation data of the minutia $M_i$. The minutia data and the fundamental relation data will collectively be called overall minutia data of the minutia $M_i$. A link or combination of the position and the direction data $x_{ir}$, $y_{ir}$, and $d_{ir}$ of the proximate minutiae $M_{ir}$ as regards the local coordinate system for the minutia $M_i$ used as the reference minutia, and the ridge counts $R_{ir}$ will now be referred to as relation link data of the reference minutia $M_i$. The minutia data and the relation link data will collectively be called overall relation link data of the reference minutia $M_i$. For each fingerprint, a set of the overall minutia data or the overall relation link data of all minutiae will now be called fingerprint data of that fingerprint.

On matching a search fingerprint with each file fingerprint, it is important to find a pair of minutia of the search fingerprint and a minutia of the file fingerprint. On finding such pairs, it is already known to use the overall relation link data for each combination of a minutia of the search fingerprint and a minutia of the file fingerprint. The memory for storing the fingerprint data of the search and the file fingerprints, therefore must have a large memory capacity. This has rendered the conventional fingerprint matching device bulky and expensive.

It should be noted in this connection that a plurality of minutiae may be found at first in one of the search and the file fingerprints as pairs of a minutia of the other fingerprint at a third step $A_3$ depicted in FIG. 9. The pairs are later processed as regards the detail into a single pair. Such "pairs" will also be called a "pair" for the time being. At any rate, it is not mandatory according to this invention to care for such a plurality of pairs. Each of the position and the direction data $X_i$, $Y_i$, and $D_i$ may therefore be given for the pair detection by a relatively coarse or wide quantization step as, for example, by only four consecutive more significant bits of each data $X_i$, $Y_i$, or $D_i$.

Figure 17:
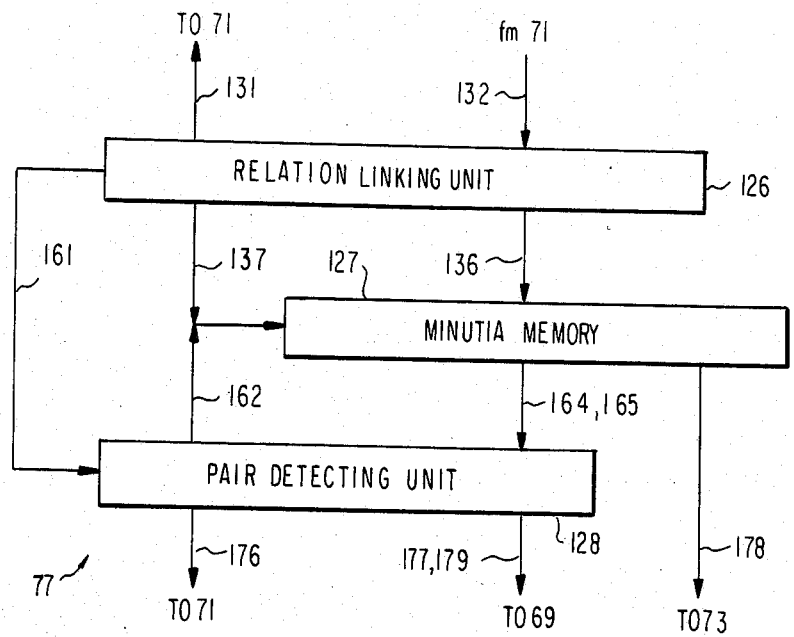
FIG. 17 is a block diagram of a pair detection circuit for use in the leading matcher shown in FIG. 6.

Referring to FIG. 17, an example of the pair detection circuit 77 (FIG. 6) is effective in rendering the fingerpint matching device 51 (FIG. 1) compact and inexpensive. The illustrated pair detection circuit 77 comprises a relation linking unit 126, a minutia memory 127, and a pair detecting unit 128 as will be described in the following.

Figure 18:
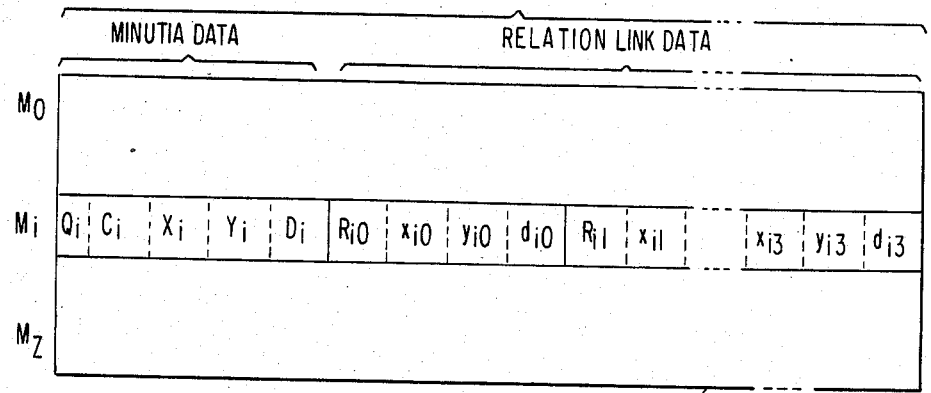
FIG. 18 shows an example of the content of a minutia list used in the pair detection circuit depicted in FIG. 17.

Turning to FIG. 18, the minutia memory 127 may store, as will shortly be described in detail, the overall relation (link) data for the search fingerprint and one file fingerpint. In a memory section (to be later described) accessible by a row address signal indicative of a reference minutia $M_i$, the minutia data $Q_i$, $C_i$, $X_i$, $Y_i$, and $D_i$ are stored in successive columns. Furthermore, the relation link data $R_{i0}$, $x_{i0}$, $y_{i0}$, $d_{i0}$, $R_{i1}$, $x_{i1}$, ..., $d_{i2}$, $R_{i3}$, $x_{i3}$, $y_{i3}$, and $d_{i3}$ are stored in successive columns. It will therefore be assumed that the minutia list memory 71 (FIG. 6, 71S or 71F) is for storing, for each minutia $M_i$, the minutia data and the fundamental relation data in the order of $Q_i$, $C_i$, $X_i$, $Y_i$, $D_i$, $R_{i0}$, $M_{i0}$, $R_{i1}$, $M_{i1}$, $R_{i2}$, ..., $R_{i3}$, and $M_{i3}$, rather than in the order exemplified in FIG. 14. The local position and direction data $x_{ir}$, $y_{ir}$, and $d_{ir}$ may, for storage in the minutia memory 127, be given by the coarse quantization step. When no proximate minutia is found in a quadrant r, a specific code is stored in place of the ridge count $R_{ir}$ for the proximate minutia $M_{ir}$.

Figure 19:
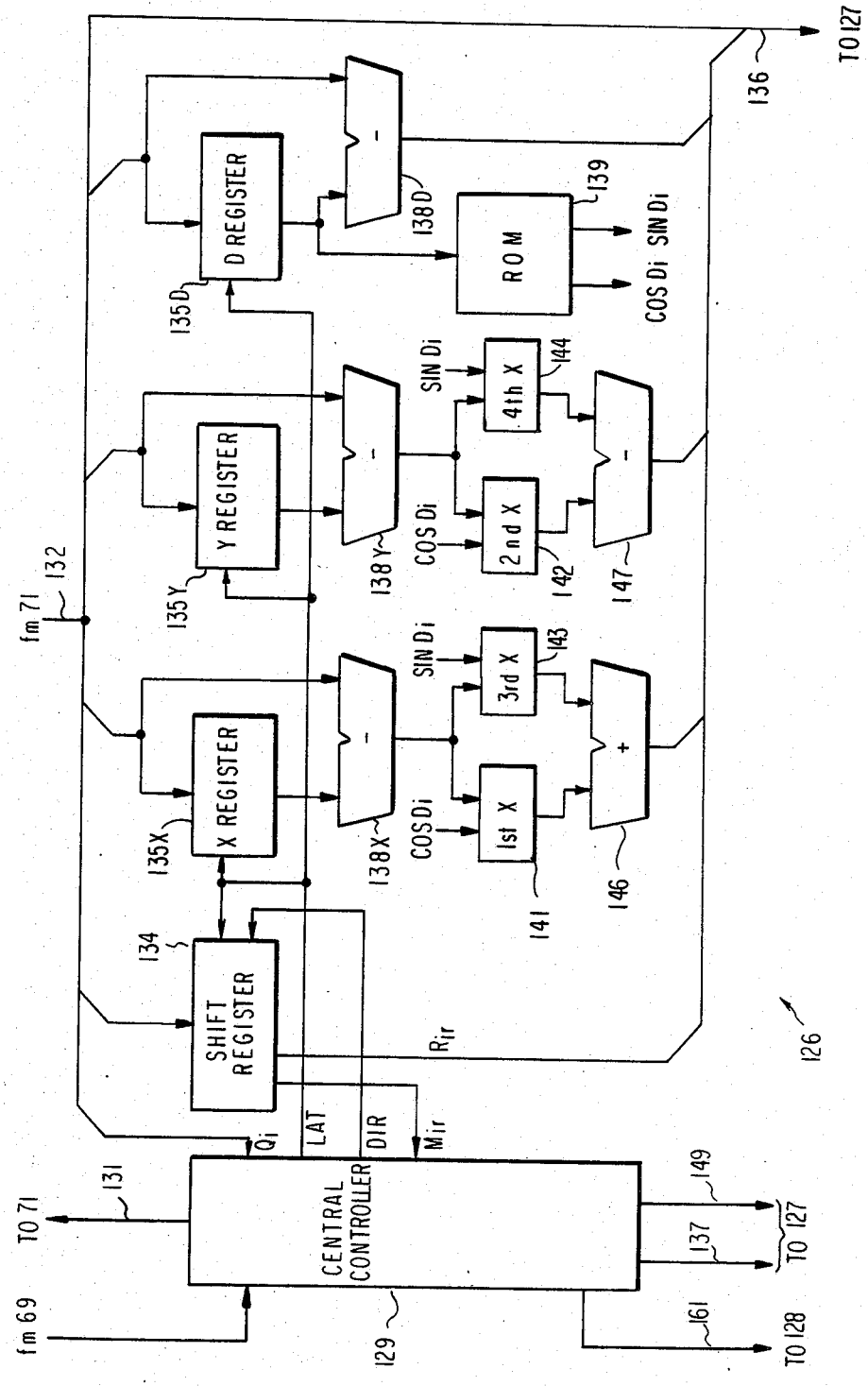
FIG. 19 is a block diagram of a relation linking unit for use in the pair detection circuit of FIG. 17.

Referring to FIG. 19, the relation linking unit 126 (FIG. 17) comprises a central controller 129 put into operation by the sequence controller 69 (FIG. 6) after completion of recovery of proximate minutiae for the search fingerprint. The controller 129 sends a first address signal 131 (also in FIG. 17) to the search minutia list memory 71S of the minutia list memory 71. An input data signal 132 (also in FIG. 17) is sent back to the relation linking unit 126. When the address signal 131 indicates the i-th minutia $M_{iS}$ as will presently be described, the data signal 132 represents the overall minutia data, namely, the minutia data $Q_{iS}$, $C_{iS}$, $X_{iS}$, $Y_{iS}$, and $D_{iS}$ and the fundamental relation data $R_{i0S}$, $M_{i0S}$, $R_{i1S}$, ..., $R_{i3S}$, and $M_{i3S}$. It is possible to make the address signal 131 give the position and the direction data $X_{iS}$, $Y_{iS}$, and $D_{iS}$ by the coarse quantization step.

The fundamental relation data are fed towards a shift register 134. The position and the direction data $X_{iS}$, $Y_{iS}$, and $D_{iS}$ are supplied towards X, Y, and D registers 135X, 135Y, and 135D. At least the minutia type $Q_{iS}$ is supplied to the controller 129. The controller 129 produces a latch pulse LAT to store the fundamental relation data in the shift register 134 and the position and the direction data in the registers 135. An output data signal 136 (also in FIG. 17) supplied towards the minutia memory 127, represents the minutia data and then other data which will later be described.

The controller 129 checks whether or not the minutia type $Q_i$ (the suffix S being omitted for a short while) represents in fact a minutia type. Having confirmed, the controller 129 supplies the minutia memory 127 with a second address signal 137 indicative of a row address for the i-th minutia $M_i$ and a column address for the minutia data and sends a directive signal DIR to the shift register 134 to make the same supply the foremost proximate minutia number $M_{i0}$ back to the controller 129, which makes the first address signal 131 indicate the proximate minutia number $M_{i0}$ instead of the i-th minutia number $M_i$. The shift register 134 furthermore produces the ridge count $R_{i0}$ as the output data signal 136.

The input data signal 132 now represents the overall minutia data for the i0-th minutia $M_{i0}$. The controller 129 makes the second address signal 137 indicate the row address for the i-th minutia $M_i$ and the column address for the ridge count $R_{i0}$ and the position and the direction data $x_{i0}$, $y_{i0}$, and $d_{i0}$ which the proxmate minutia $M_{i0}$ of the first quadrant has relative to the i-th minutia $M_i$ used as the reference minutia.

Among the overall minutia data of the i0-th minutia $M_{i0}$, the position and the direction data $X_{i0}$, $Y_{i0}$, and $D_{i0}$ are supplied directly to X, Y, and D subtractors 138X, 138Y, and 138D which are also supplied with the contents of the registers 135. The subtractors 138 calculate X, Y, and D differences $(X_{i0} - X_i)$, $(Y_{i0} - Y_i)$, and $(D_{i0} - D_i)$. The content of the D register 135D is supplied also to an ROM 139, similar to the ROM 94 (FIG. 13), for producing values $\cos D_i$ and $\sin D_1$. The ROM 139 may, however, be simpler than the ROM 94 because each value $\cos D_i$ or $\sin D_i$ may have a lesser number of bits.

The X and the Y differences are supplied to first and second multipliers 141 and 142, respectively, to which the value $\cos D_i$ is supplied in common. The differences are supplied also to third and fourth multipliers 143 and 144, to which the value $\sin D_i$ is supplied in common. First and second products are delivered to an adder 146 and a subtractor 147, respectively. Third and fourth products are fed to the adder 146 and the subtractor 147, respectively. It is now understood that the elements 135, 138, 139, 141 through 144, 146, and 147 are for carrying out the forward transformation of the principal coordinate system for the search fingerprint to a local coordinate system for the i-th minutia $M_i$. The adder 146, the subtractor 147, and the D subtractor 138D are for making the output data signal 136 include the position and the direction data $x_{i0}$, $y_{i0}$, and $d_{i0}$ which the proximate minutia $M_{i0}$ has in the local coordinate system.

Thereafter, the controller 129 again produces the directive signal DIR to make the shift register 134 send the next following proximate minutia number $M_{i1}$ back to the controller 129 and the ridge count $R_{i1}$ as a part of the output data signal 136. The second address signal 137 is now made to represent the row address for the i-th minutia $M_i$ and the column address for the ridge count $R_{i1}$ and the position and the direction data $x_{i1}$, $y_{i1}$, and $d_{i1}$. The input data signal 132 supplies the position and the direction data $X_{i1}$, $y_{i1}$, and $D_{i1}$ of the i1-th minutia $M_{i1}$ to the subtractors 138's. The coordinate transformation is again carried out to make the output data signal 136 include the position and the direction data $x_{i1}$, $y_{i1}$, and $d_{i1}$ as another part.

The processes described above in connection with the proximate minutiae $M_{i0}$ and $M_{i1}$ are repeated for the other proximate minutiae $M_{i2}$ and $M_{i3}$ to complete the relation linking operation for the i-th minutia $M_i$. When the processes are carried out for the last minutia $M_z$ of the search fingerprint, the controller 129 supplies the minutia memory 127 (FIG. 17) with a transfer signal 149 for the purpose which will shortly be described. The relation linking unit 126 subsequently repeats the relation linking operation as regards the minutiae $M_0$ through $M_z$ of the file fingerprint (the suffix z used for the file fingerprint being generally greater than the suffix z for the search fingerprint as pointed out heretobefore).

Figure 20:
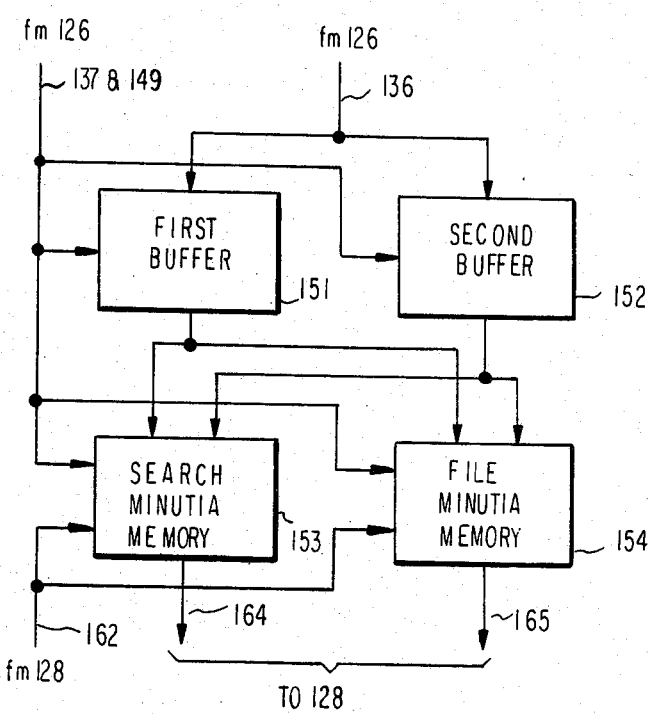
FIG. 20 is a block diagram of a minutia memory for use in the pair detection circuit of FIG. 17.

Turning to FIG. 20, the minutia memory 127 (FIG. 17) comprises first and second buffer memories 151 and 152, each having memory sectors accessible by the second address signal 137 indicative of the reference minutia numbers, such as $M_i$. Each memory sector has fields having column addresses accessed also by the second address signal 137.

Each of search and file minutia memories 153 and 154 also has memory sectors accessible by the address signal 137 to store the overall relation data as exemplified in FIG. 18.

As described heretofore, the output data signal 136 produced by the relation linking unit 126 for the i-th minutia $M_i$, represents at first the minutia data of the minutia $M_i$. Later, the data signal 146 repeatedly produced for each proximate minutia $M_{ir}$ of the i-th minutia $M_i$, represents the ridge count $R_{ir}$ between the i-th and the ir-th proximate minutiae $M_i$ and $M_{ir}$ and also the position and the direction data $x_{ir}$, $y_{ir}$, and $d_{ir}$ of the proximate minutia $M_{ir}$ as regerds the local coordinate system defined for the i-th minutia $M_i$.

The data represented by the output data signal 136 are successively stored by the second address signal 137 in the respective fields of the memory sector for the i-th minutia $M_i$ in one of the first and the second buffer memories 151 and 152 that is rendered empty as will presently become clear. Merely for clarity of description, let the first buffer memory 151 be empty for the time being. The overall relation data obtained for the minutiae $M_0$ through $M_z$ of the search fingerprint, are thus stored in the first buffer memory 151. At this instant, the central controller 129 (FIG. 19) produces the transfer signal 149 as described before. The transfer signal 149 is for moving the overall relation data from the first buffer memory 151 to the search minutia memory 153. The first buffer memory 151 is thus rendered empty.

During transfer of the overall relation data for the search fingerprint by the transfer signal 149 and the second address signal 137, the relation linking unit 126 successively produces the overall relation data for the file fingerprint. According to the assumption described above, the second buffer memory 52 is rendered empty already before beginning of the relation linking operation for the file fingerprint. The overall relation data are therefore stored in the second buffer memory 152. The transfer signal 149 produced subsequent to completion of the relation linking operation for the file fingerprint, is for moving the overall relation data from the second buffer memory 152 to the file minutia memory 154 and for eventually rendering the second buffer memory 152 empty.

As described before, a great number of file fingerprints must be checked for each search fingerprint. While the overall relation data are moved from the second buffer memory 152 to the file minutia memory 154, the relation linking operation is carried out for a second one of the file fingerprints. The overall relation data for the second file fingerprint are stored in the first buffer memory 151.

Figure 27:
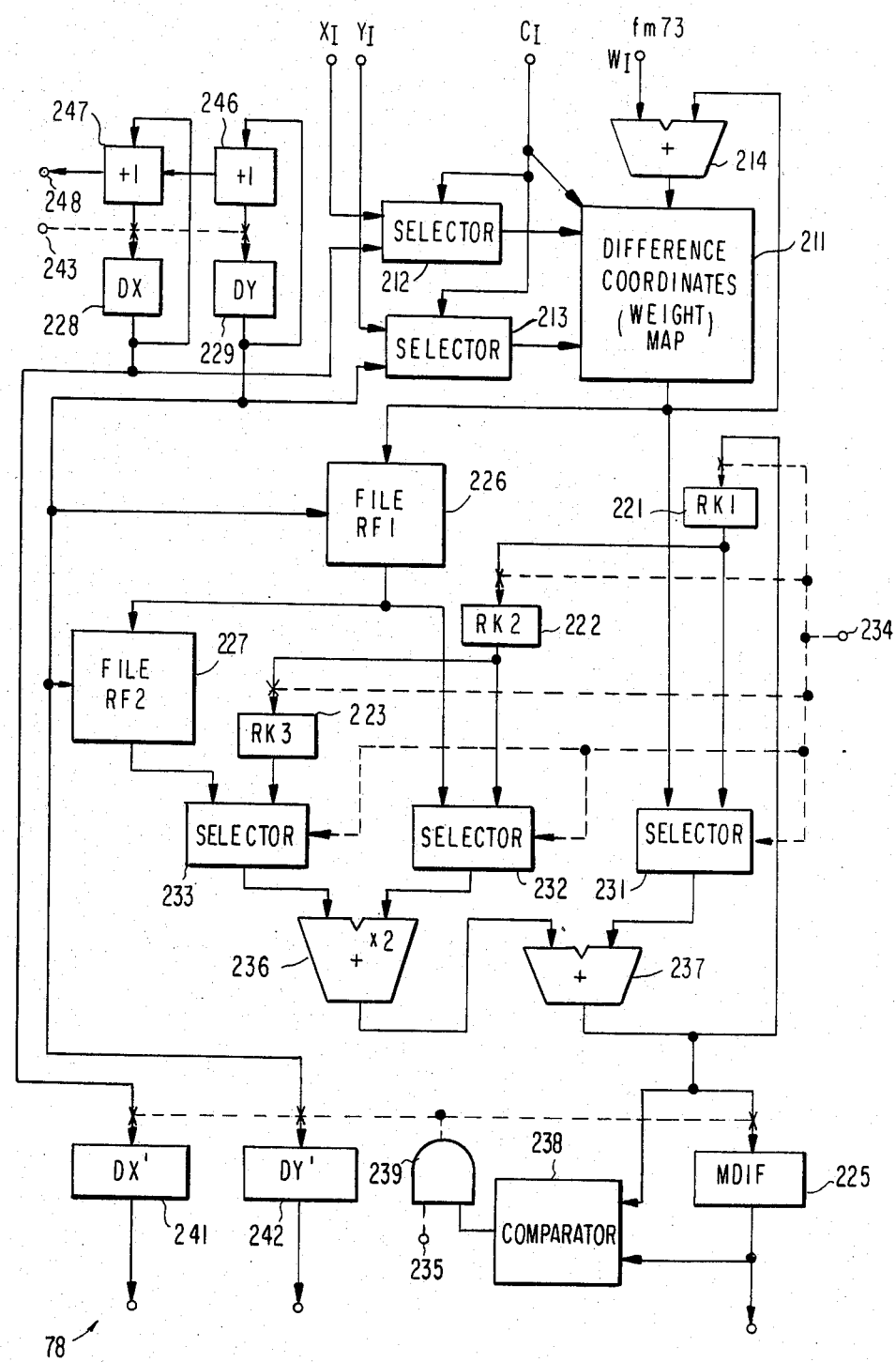
FIG. 27 is a block diagram of an adjustment amount deciding circuit for use in the leading matcher depicted in FIG. 6.

As will later be described, the overall relation data previously stored in the file minutia memory 154 are successively supplied to the pair detecting unit 128 (FIG. 27). The file minutia memory 154 is thereby rendered empty. The overall relation data for the second file fingerprint are therefore moved from the first buffer memory 151 to the file minutia memory 154 by the transfer signal 149.

It is now understood that the transfer signal 149 is for the search minutia memory 153 at first and then repeatedly for the file minutia memory 154. In this manner, the first and the second buffer memories 151 and 152 are alternatingly used in loading the file minutia memory 154 with the overall relation data of the successive ones of the file fingerprints. Meanwhile, the search minutia memory 153 keeps the overall relation data for each search fingerprint. After the overall relation data of all file fingerprints are used by the pair detecting unit 128, it is possible to use the search minutia memory 153 for the overall relation data of another search fingerprint.

Figure 21:
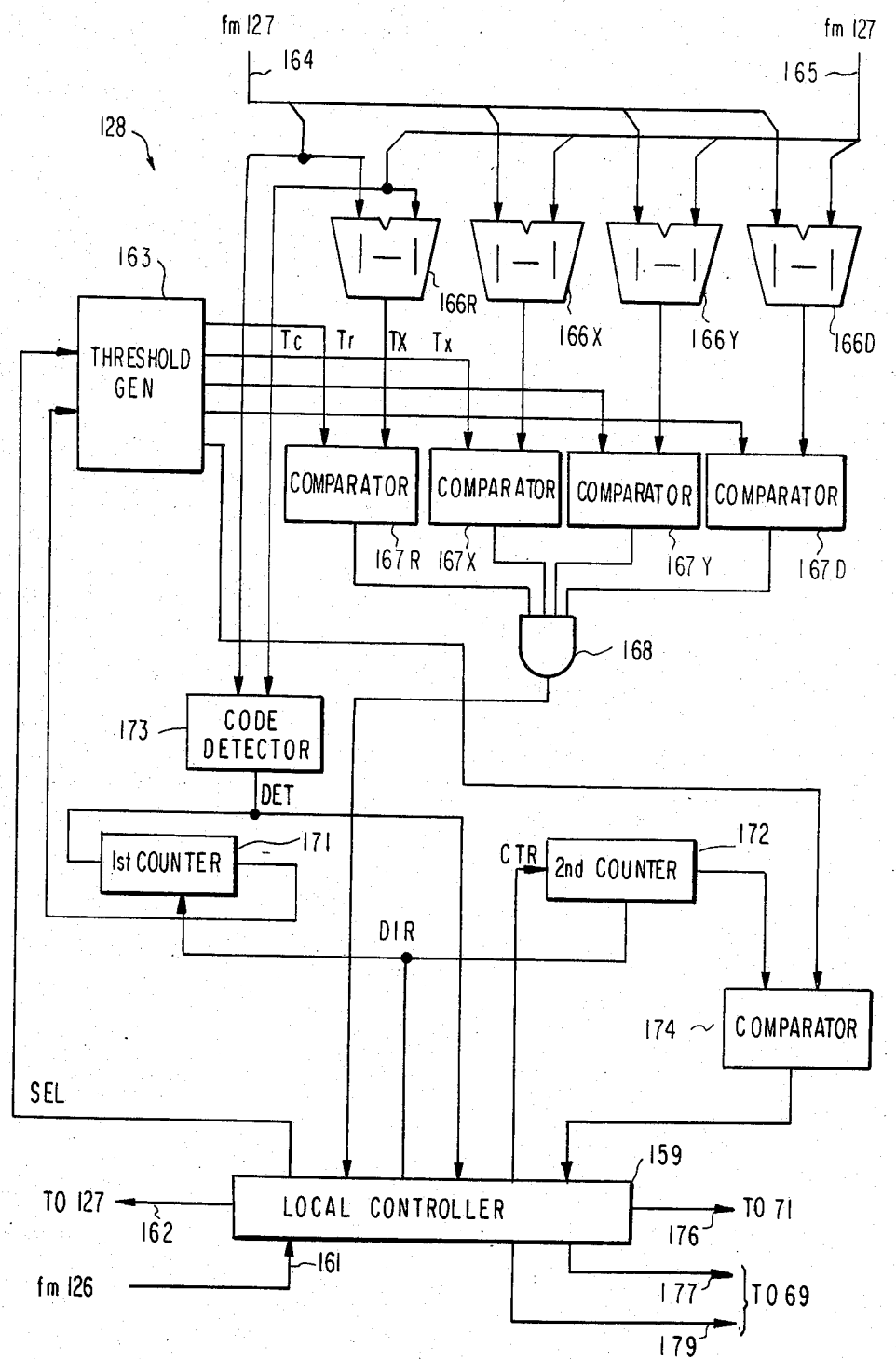
FIG. 21 is a block diagram of a pair detecting unit for use in the pair detection circuit of FIG. 17.

Referring to FIG. 21, an examle of the pair detecting unit 128 (FIG. 17) comprises a local controller 159. Each time the file fingerprint data (overall relation data of one file fingerprint) are stored in the file minutia memory 153 (FIG. 20) with the search fingerprint data kept in the search minutia memory 153, the central controller 129 (FIG. 19) produces a command signal 161 (also in FIG. 17). Supplied with the command signal 161, the local controller 159 delivers an address signal 162 (also in FIGS. 17 and 20) to the search and the file minutia memories 153 and 154. The controller 159 furthermore sends a selection signal SEL to a threshold generator 163.

In each of the minutia memories 153 and 154, the address signal 162 accesses at first the memory sector for the zeroth minutia $M_0$. In each memory sector, the address signal 162 specifies the column address for the minutia data at first and then successively the column addresses for the respective proximate minutiae. Thereafter, the address signal 162 similarly accesses the memory sectors for the successive file (fingerprint) minutiae while accessing the zeroth search minutia $M_0$. Subsequently, the address signal 162 likewise accesses the next search minutia and the successive file minutiae. Let it now be assumed that the address signal 162 accesses the i-th search minutia $M_{iS}$ and the j-th file minutia $M_{jF}$. The minutia numbers $M_{iS}$ and $M_{jF}$ are retained in the controller 159 for the purpose which will later become clear.

While each column address for the minutia data is specified by the address signal 162, the selection signal SEL makes the threshold generator 163 produce coarse thresholds $T_C$, $T_X$, $T_Y$, and $T_D$ which will presently become clear. While the column address for each proximate minutia is specified, the selection signal SEL makes the threshold generator 163 produce other coarse thresholds $T_r$, $T_x$, $T_y$, and $T_d$.

Responsive to the address signal 162, the search and the file minutia memories 153 and 154 supply data signals 164 and 165 (also in FIGS. 17 and 20) to R, X, Y, and D subtractors 166R, 166X, 166Y, and 166D, each being for calculating the absolute value of a difference between the data represented by the data signals 164 and 165. The absolute values are delivered to R, X, Y, and D comparators 167R, 167X, 167Y, and 167D for comparing the absolute values with the respective (coarse) thresholds as will be described in the following.

At the outset, the R subtractor 166R is for the concentrations $C_{iS}$ and $C_{jF}$. The other subtractors 166 are for the position and the direction data of the search and the file minutiae. The comparators 167 supply an AND circuit 168 with logic one signals if:

$$\left.\begin{array}{r} |C_{is} - C_{jF}| \leq T_C, \\ |X_{is} - X_{jF}| \leq T_X, \\ |Y_{is} - Y_{jF}| \leq T_Y, \\ \text{and } |D_{is} - D_{jF}| \leq T_D. \end{array}\right\} \quad (6)$$

The AND circuit 168 sends an output signal to the controller 159 only when the logic one signals are supplied thereto from all comparators 167. Responsive to the output signal, the controller 159 sends a directive signal DIR to reset first and second counters 171 and 172 to zero. Furthermore, the controller 159 makes the address signal 162 specify the column address for the foremost proximate minutia in each memory sector as briefly described before.

The R subtractor 166R is now for the ridge counts $R_{irS}$ and $R_{jrF}$. As described hereinabove and will shortly become clearer, the ridge counts $R_{irS}$ and $R_{jrF}$ represented by the respective data signals 164 and 165 are supplied also to a code detector 173 for detecting if the specific code is present instead of the ridge count $R_{irS}$ or $R_{jrF}$. The AND circuit 163 delivers the output signal to the controller 159 only if:

$$\left.\begin{array}{r} |R_{irS} - R_{jrF}| \leq T_r, \\ |x_{irS} - x_{jrF}| \leq T_x, \\ |y_{irS} - y_{jrF}| \leq T_y, \\ \text{and } |d_{irS} - d_{jrF}| \leq T_d. \end{array}\right\} \quad (6)$$

Responsive to this output signal, the controller 159 sends a count signal CTR to the second counter 172 to add one to its content. If the specific code is detected instead of at least one of the ridge counts $R_{irS}$ and $R_{jrF}$, the code detector 173 sends a detection signal DET to the first counter 171 and also to the controller 159. The detection signal DET adds one to the content of the first counter 171 and prevents the controller 159 from producing the count signal CTR irrespective of the output signal of the AND circuit 168.

The content of the first counter 171 is supplied to the threshold generator 163, which produces a threshold corresponding to the number of specific codes. The threshold is delivered to a comparator 174 for comparison with the count of the second counter 172. When the count of the second counter 172 is equal to or greater than the threshold, the comparator 174 supplies the controller 169 with a similarity signal indicative of a local similarity between the minutiae $M_{iS}$ and $M_{jF}$.

Responsive to the similarity signal, the controller 159 supplies the sequence controller 69 (FIG. 6) with an address signal 176 (also in FIG. 17) representative of the search and the file minutia numbers $M_{iS}$ and $M_{jF}$ retained therein. The controller 159 furthermore supplies the sequence controller 169 with a data signal 177 representative of the local similarity represented by the similarity signal. Meanwhile the controller 159 may keep the address signal 162 indicative of the row addresses for the minutiae $M_{iS}$ and $M_{jF}$ to make the minutia memories 153 and 154 (FIG. 20) produce the data signals 164 and 165 (collectively denoted by 178 in FIG. 17). Moreover, the controller 159 delivers an instruction signal 179 (also in FIG. 17) to the sequence controller 69. Thereafter, the controller 159 makes the address signal 162 indicate a next one of the search minutiae and successively the zeroth through the z-th file minutiae.

It will now be understood that the order of the minutiae $M_{iS}$ and $M_{jF}$ designated by the address signal 162 need not be as described above. The minutia memory 127 may not be an independent unit but may be a part of the relation linking unit 126 or of the pair detecting unit 128.

Modifications of Pair Detection

As will presently be described more in detail, a certain amount of error is unavoidable between the principal coordinate system selected for each file fingerprint and the central coordinate system into which the principal coordinate system for each search fingerprint is forwardly transformed. This is also the case even when the principal coordinate system for the file fingerprint is forwardly transformed to provide a match with the principal coordinate system for each search fingerprint.

The error between the origins of the principal and the central coordinate systems equally affects the position and the direction data of a minutia near to each origin and the data of a minutia remote therefrom. It is therefore possible to cover the error by the thresholds $T_X$, $T_Y$, and $T_D$ and $T_x$, $T_y$, and $T_d$. The error resulting from the direction of the coordinate axis, however, grows greater for remoter minutiae. If the thresholds are selected to cover the greater error, the accuracy of the pair detection degrades for nearer minutiae.

Figure 22:
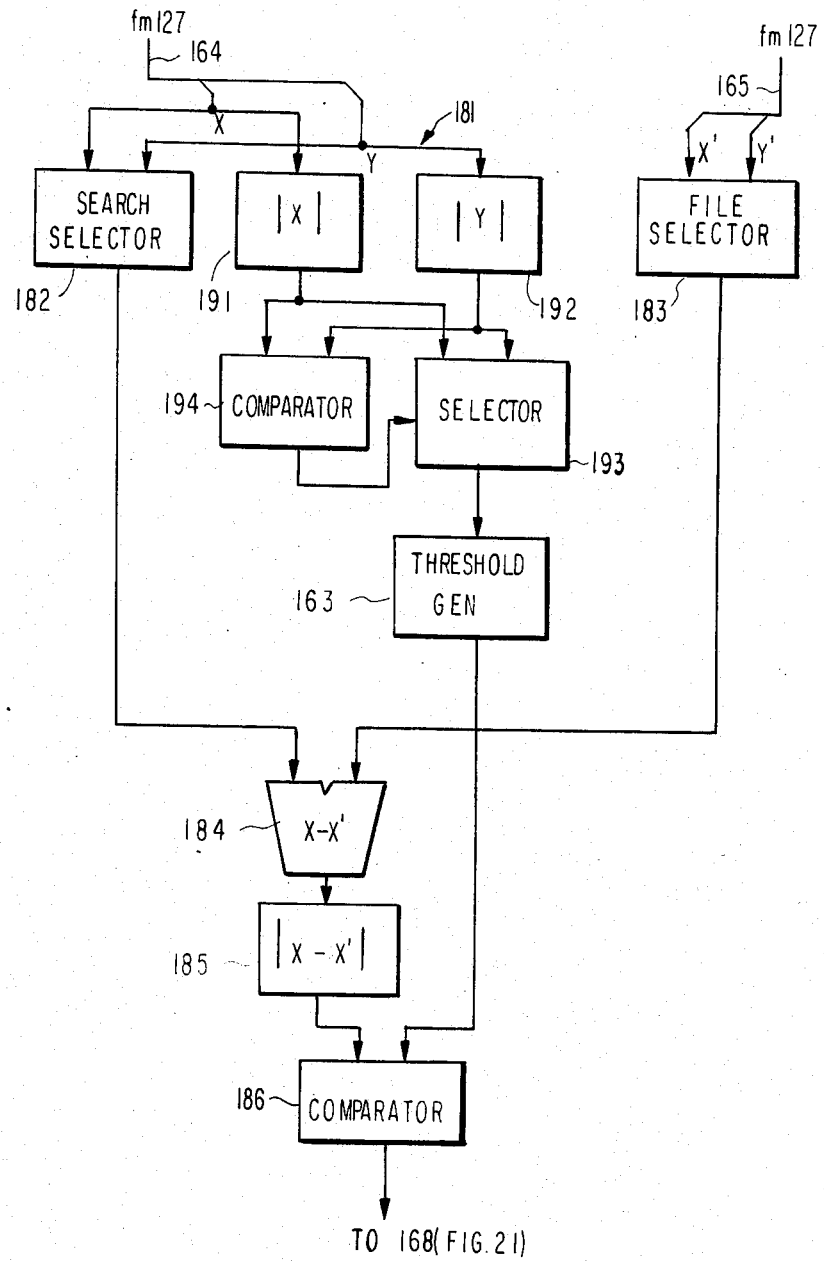
FIG. 22 is a block diagram of a part of a modification of the pair detecting unit depicted in FIG. 21.

Referring to FIG. 22, a modification of the pair detecting unit 128 (FIGS. 17 and 21) is for raising the accuracy. For use as a part of the pair detecting unit 128 illustrated with reference to FIG. 21, a threshold selector 181 is supplied with the data signal 164 successively representative of combinations of the position data $X_{iS}$ and $Y_{iS}$ and the position data $x_{irS}$ and $y_{irS}$ (collectively denoted by X and Y). On the other hand, the position data X and Y and the position data X' and Y' ($X_{jF}$ and $Y_{jF}$ or $x_{jrF}$ and $y_{jrF}$) are supplied to search and file selectors 182 and 183. The local controller 159 (FIG. 21) selects one of the combination X and X' and the combination Y and Y' at first and then the other. The selected combination X and X' or Y and Y' is supplied to a subtractor 184 and thence to an aboslute value circuit 185, which supplies a comparator 186 with $|X-X'|$ or $|Y-Y'|$.

In the threshold selector 181, the position data X and Y are delivered to X and Y absolute value circuits 191 and 192. The absolute values produced by the absolute value circuits 191 and 192 are fed to a selector 193 and furthermore compared with each other by a comparator 194. Supplied with the greater absolute value, the threshold generator 163 (corresponding to that described in conjunction with FIG. 21) produces the threshold T or t and $T_D$ or T.

A combination of the subtractor 184 and the absolute value circuit 185 correspond to a combination of the subtractors 166X and 166Y. The comparator 186 corresponds to a combination of the comparators 167X and 167Y. The threshold T is for use as either of the thresholds $T_X$ and $T_Y$ and the threshold t, as either of $T_x$ and $T_y$.

Figure 23:
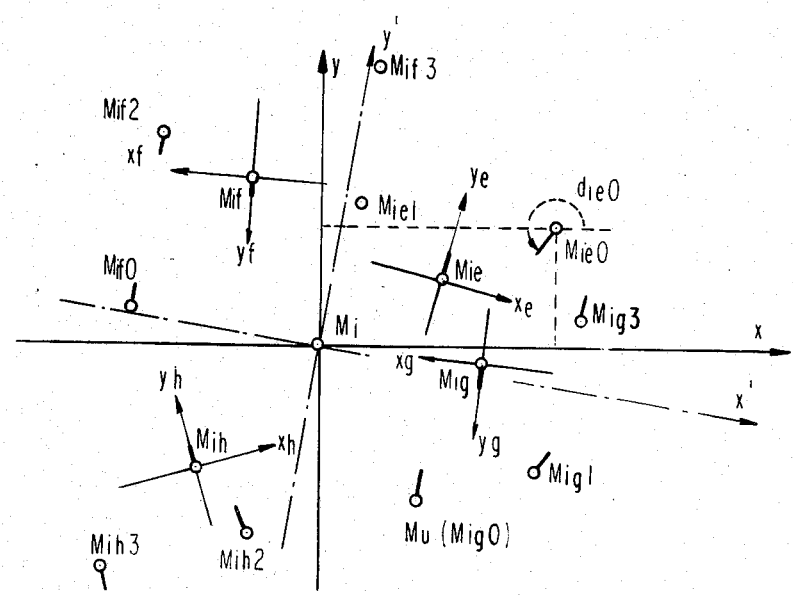
FIG. 23 shows a coordinate plane for use in describing additional relation data.

Referring now to FIG. 23, the relation data are substantially independent of the principal coordinate system as pointed out hereinabove. The error between the principal coordinate systems, however, results in an error between the local coordinate systems which are defined for a search and a file minutia. An i-th minutia $M_i$ of a file fingerprint of a certain finger will be taken into consideration as a reference minutia. According to an x-y local coordinate system based on the principal coordinate system, the reference minutia $M_i$ has proximate minutiae $M_{ir}$ as exemplified in FIG. 4. The proximate minutiae will now be called primary proximate minutiae and represented by $M_{ie}$, $M_{if}$, $M_{ig}$, and $M_{ih}$ as depicted in FIG. 23. The primary proximate minutiae will either singly or collectively denoted by $M_{ik}$.

A search fingerprint of the finger under consideration is printed on different conditions as described heretobefore. It is very likely that a different principal coordinate system is selected for the search fingerprint. Even though transformed from the different principal coordinate system with best care, the central coordinate system may have a difference from the principal coordinate system selected for the file fingerprint.

Let the minutia in question in the search fingerprint be numbered also as the i-th minutia $M_i$ for brevity of description. In the illustrated example, an x'-y' local coordinate system is based on the central coordinate system. The proximate minutia $M_{ig}$ is remoter than the minutia $M_{ie}$ in the first quadrant of the local x'-y' coordinate system and is therefore not found as a primary proximate minutia. Instead, another minutia $M_u$ is found as a primary proximate minutia in the fourth quadrant. This again results in a reduction in the accuracy.

Figure 24:
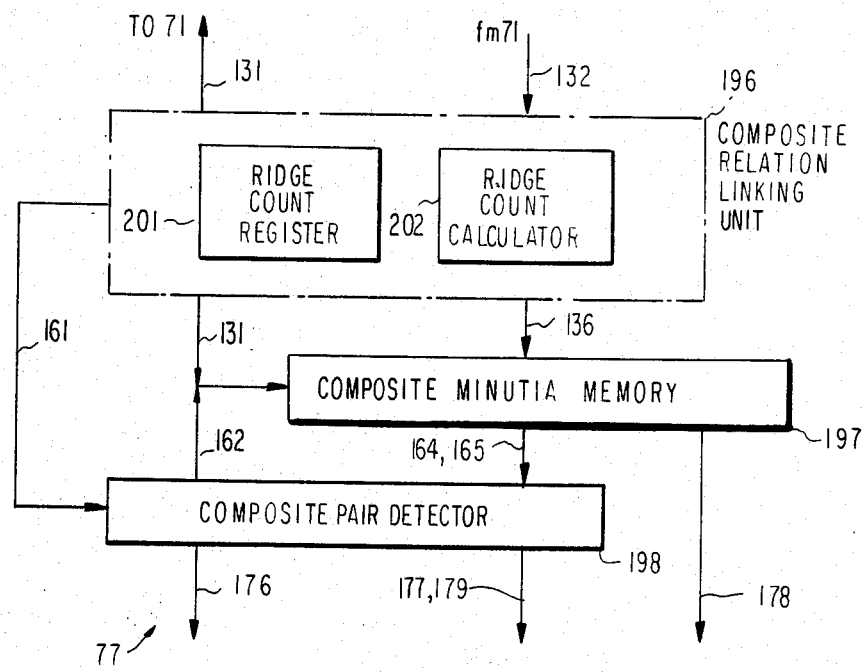
FIG. 24 is a block diagram of a pair detection circuit in which the additional relation data are used.

Referring to FIG. 24, a modification of the pair detection circuit 77 (FIG. 6) is effective in raising the accuracy. The circuit 77 comprises a composite relation linking unit 196, a composite minutia memory 197, and a composite pair detecting unit 198, all similar to the corresponding units 126 through 128 described in conjunction with FIGS. 17 through 21. Incidentally, it will be assumed that the minutia list memory 71 (FIG. 6) is already loaded with the minutia data and the fundamental relation data of both a search fingerprint and one file fingerprint in the manner exemplified in FIG. 14.

Turning back to FIG. 23, the x-y coordinate system having the local origin at a reference minutia $M_i$ will now be called a primary coordinate system. The relation link data $R_{ik}$, $x_{ik}$, $y_{ik}$, and $d_{ik}$ calculated for the primary proximate minutia $M_{ik}$ and shown in FIG. 18, will be referred to as primary relation data of the reference minutia $M_i$.

In the manner described in connection with the primary coordinate system, secondary coordinate systems $x_e$-$y_e$, $x_f$-$y_f$, $x_g$-$y_g$, and $x_h$-$y_h$ or $x_k$-$y_k$ are defined to have the respective origins at the primary proximate minutiae $M_{ik}$ and the coordinate axes coincident with the direction data $d_{ik}$ of the primary proximate minutiae $M_{ik}$. Proximate minutiae $M_{ikr}$ which are found in relation to the secondary coordinates system defined for each primary proximate minutia $M_{ik}$, will be called secondary proximate minutiae of the reference minutia $M_i$. If a specific minutia proximate to one of the primary proximate minutie $M_{ik}$ is coincident with the reference minutia $M_i$ or another primary proximate minutia, the specific minutia need not be included in the secondary proximate minutiae. If a secondary proximate minutia found as regards a primary proximate minutia $M_{ik}$, coincides with a secondary proximate minutia resulting from another primary proximate minutia, it is sufficient to use only one of the two as a secondary proximate minutia.

For the example being illustrated, the secondary proximate minutiae are minutiae $M_{ie0}$, $M_{ie1}$, $M_{if0}$, $M_{if2}$, $M_{if3}$, $M_{ig0}$, $M_{ig1}$, $M_{ig3}$, $M_{ih2}$, and $M_{ih3}$. A minutia which is proximate to the primary proximate minutia $M_{ie}$ in the fourth quadrant of the secondary coordinate system $x_e$-$y_e$ and which may be selected as a secondary proximate minutia $M_{ie2}$, is coincident with the primary proximate minutia $M_{ig}$. A minutia proximate to the primary proximate minutia $M_{ie}$ in the third quadrant to be selected as a secondary proximate minutia $M_{ie3}$, is coincident with the reference minutia $M_i$. A minutia to be selected as a secondary proximate minutia $M_{if1}$ in the secondary coordinate system $x_f$-$y_f$, is already selected as the secondary proximate minutia $M_{ie1}$. The secondary proximate minutiae selected in this manner, will either singly or collectively be denoted by $M_{ikr}$.

It is already described that the primary proximate minutiae $M_{ik}$ have the primary relation data of the minutia $M_i$, namely, the ridge counts $R_{ik}$ relative to the reference minutia $M_i$. The primary proximate minutiae $M_{ik}$ furthermore have and the position and the direction data $x_{ik}$, $y_{ik}$, and $d_{ik}$ as regards the primary coordinate system having the local origin at the minutia $M_i$. Likewise, each secondary proximate minutia $M_{ikr}$ has position and direction data $x_{ikr}{}^k$, $y_{ikr}{}^k$, and $d_{ikr}{}^k$ as regards the secondary coordinate system $x_k$-$y_k$ having the origin at each primary proximate minutia $M_{ik}$ and a ridge count $R_{ikr}$ between the secondary proximate minutia $M_{ikr}$ and the primary proximate minutia $M_{ik}$.

Each primary proximate minutia $M_{ik}$, although so named, in an ik-th minutia. The ridge count and the position and the direction data which the secondary poroximate minutiae $M_{ikr}$ have relative to the primary proximate minutia $M_{ik}$, are therefore readily obtained by the relation linking unit 126 illustrated with reference to FIG. 19 with reference to the minutia list memory 71 (FIG. 6) loaded with the minutia and the fundamental relation data of the ik-th minutia $M_{ik}$ as exemplified in FIG. 14.

It is, however, desirable for use in the pair detection that the ridge count should be the number of ridges between the reference minutia $M_i$ and each secondary proximate minutia $M_{ikr}$. Furthermore, the position and the direction data should be given in direct relation to the primary coordinate system having the local origin at the reference minutia $M_i$. The latter ridge counts and position and direction data for all secondary proximate minutiae of the reference minutia $M_i$ will be called secondary relation data of the reference minutia $M_i$. The secondary relation data of either one or all of the secondary proximate minutiae $M_{ikr}$ will now be denoted by $r_{ikr}$, $x_{ikr}$, $y_{ikr}$, and $d_{ikr}$.

Like the primary proximate minutia $M_{ik}$, each secondary proximate minutia $M_{ikr}$ is an ikr-th minutia. It is therefore possible to readily obtain the position and the direction data $x_{ikr}$, $y_{ikr}$, and $d_{ikr}$ by using the relation linking unit 126 exemplified in FIG. 19 and by giving the translation components x and y and the angle of rotation $\phi$ the position and the direction data $X_i$, $Y_i$, and $D_i$ of the reference minutia $M_i$ rather than the position and the direction data $X_{ik}$, $Y_{ik}$, and $D_{ik}$ of each primary proximate minutia $M_{ik}$.

As for the ridge count $r_{ikr}$, attention should be directed to the fact that each secondary proximate minutia $M_{ikr}$ is remoter from the reference minutia $M_i$ than the primary proximate minutia $M_{ik}$ for the secondary proximate minutia $M_{ikr}$ under consideration in that quadrant of the primary coordinate system in which the primary proximate minutia $M_{ik}$ is present. The ridge count $r_{ikr}$ is therefore readily calculated by using the ridge counts $R_{ik}$ and $R_{ikr}{}^k$. The ridge count $R_{ik}$ is given in the minutia list memory 71 (FIG. 6) for the reference minutia $M_i$. The other ridge count $R_{ikr}{}^k$ is also given in the minutia list memory 71 for the ik-th minutia $M_{ik}$.

Figures 25, 26:
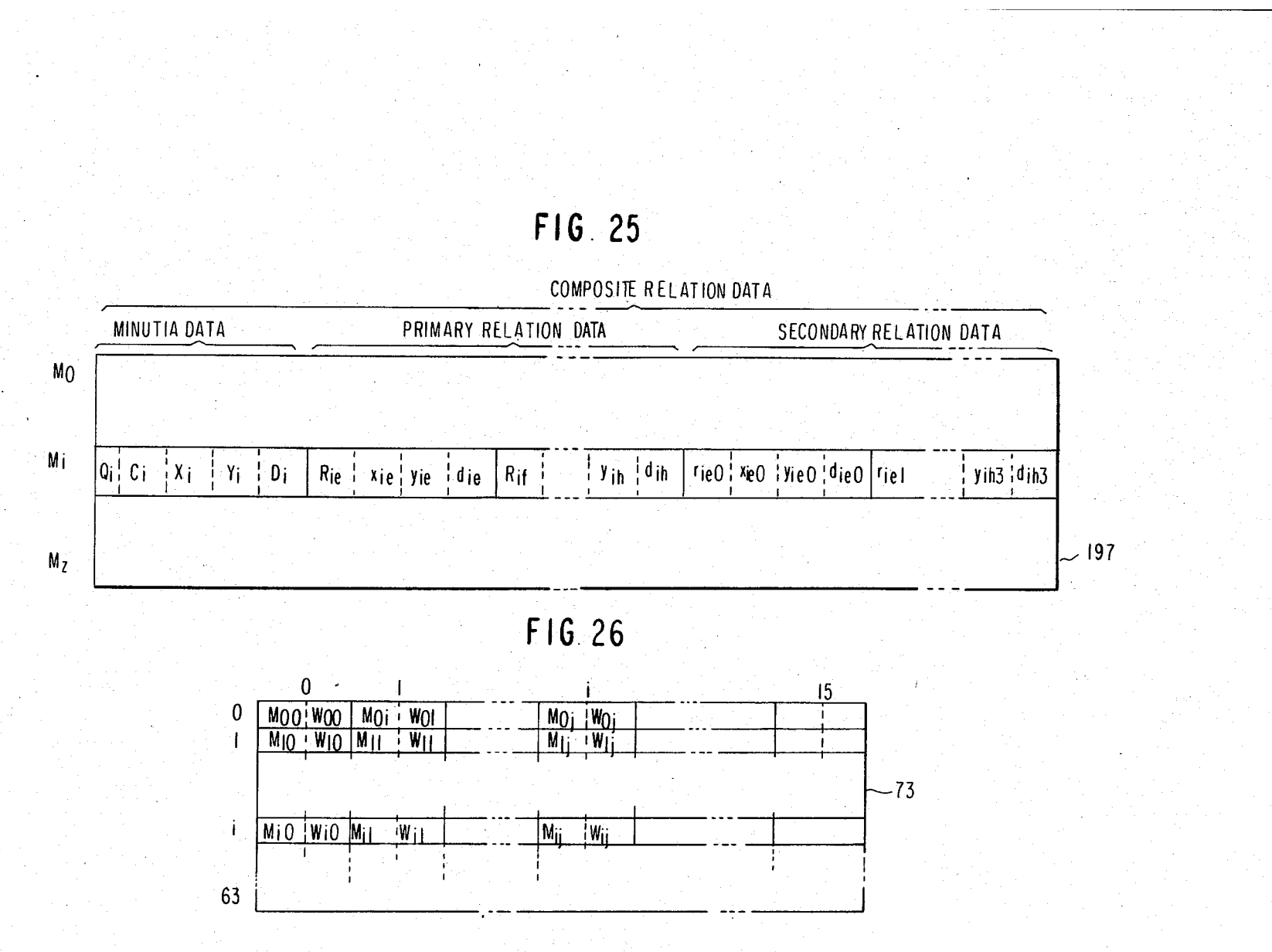

Turning to FIG. 25, the composite minutia memory 197 is for storing a sequence of the minutia data of each minutia $M_i$ and the primary and the secondary relation data thereof for the search fingerprint and one file fingerprint at a time. The sequence will be called composite relation link data.

Referring to FIG. 24 once again, the composite relation linking unit 196 is for calculating the composite relation link data of each minutia $M_i$ of the search or the file fingerprint for storage in the composite minutia memory 197 as exemplified in FIG. 25. An example of the composite relation linking unit 196 comprises a ridge count register 201 and a ridge count calculator 202 in addition to the circuitry illustrated with reference to FIG. 19. The ridge count register and calculator 201 and 202 will presently be described more in detail. The signals used for and in the pair detection circuit 77 will be called as before and designated by like reference numerals although there are certain differences between the signals being used and the previously described signals as will shortly become clear.

Turning back to FIG. 19, the illustrated relation linking unit 126 carries out the relation linking operation also in the composite relation linking unit 196 (FIG. 24) as described heretobefore until the fundamental relation data $R_{ik}$ and $M_{ik}$ of the i-th minutia $M_i$ are supplied as the input data signal 132 from the minutia list memory 71 (FIG. 6, 71S or 71F) accessed by the first address signal 131 indicative of the minutia number $M_i$. The output data signal 136, the second address signal 137, and the transfer signal 149 are delivered towards the composite minutia memory 197 instead of the minutia memory 127 (FIGS. 17 and 20).

Before delivery of the foremost primary proximate minutia $M_{ie}$ back to the central controller 129 from the shift register 134, the ridge count $R_{ie}$ produced from the shift register 134 and included in the output data signal 136, is fed also to the ridge count register 201 (FIG. 24) and stored therein. When the ie-th minutia $M_{ie}$ is indicated by the first address signal 131 instead of the i-th minutia $M_i$, the controller 129 retains the reference minutia number $M_i$. The fundamental relation data $R_{ie0}$, $M_{ie0}$, $R_{ie1}$, ..., $R_{ie3}$, and $M_{ie3}$ of the ie-th minutia $M_{ie}$, namely the primary proximate minutia $M_{ie}$, are included in the input data signal 132 and stored in the shift register 134 in the shift register stages next following the stage to which the last datum $M_{ih}$ of the previously stored fundamental relation data of the i-th minutia $M_i$ is shifted. The controller 129 retains also the primary proximate minutia number $M_{ie}$.

Having carried out the relation linking operation of the primary relation data as regards the primary proximate minutia $M_{ie}$, the controller 129 receives the next following primary proximate minutia number $M_{if}$ from the shift register 134 to make the first address signal 131 specify the if-th minutia $M_{if}$ as described hereinabove. The controller 129 retains the minutia number $M_{if}$.

In this manner, the controller 129 retains for each reference minutia $M_i$, the reference minutia number $M_i$ and the primary proximate minutia numbers $M_{ik}$. The ridge count register 201 keeps the ridge counts $R_{ik}$. The registers 135's still keep the position and the direction data $X_i$, $Y_i$, and $D_i$ of the reference minutia $M_i$.

After the primary relation data of the reference minutia $M_i$ are stored in the composite minutia memory 197, the controller 129 receives the foremost secondary proximade minutia number, such as $M_{ie0}$, from the shift register 134 and compares the same with the minutia numbers $M_i$ and $M_{ik}$ retained therein. If different, the controller 129 holds the minutia number $M_{ie0}$ and makes the first address signal 131 specify the ie0-th minutia $M_{ie0}$ and the second address signal 137 indicate the row address of the reference minutia $M_i$ and the column address for the ridge count $r_{ie0}$ and the position and the direction data $x_{ie0}$, $y_{ie0}$, and $d_{ie0}$.

In the meantime, the controller 129 makes the ridge count register 201 supply the ridge count $R_{ik}$ to the ridge count calculator 202 and makes the shift register 134 deliver the ridge count $R_{ie0}$ also to the ridge count calculator 202. The ridge count calculator 202 produces the ridge count $r_{ikr}$ as a part of the output data signal 136.

The position and the direction data $X_{ie0}$, $Y_{ie0}$, and $D_{ie0}$ comprised by the input data signal 132 are delivered directly to the subtractors 138. The adder 146, the subtractor 147, and the D subtractor 138D produce the position and direction data $x_{ie0}$, $y_{ie0}$, and $d_{ie0}$ as another part of the output data signal 136.

Subsequently, the controller 129 receives the next following secondary proximate minutia number, such as the ie1-th minutia number $M_{ie1}$. If the minutia number $M_{ie1}$ is different from the reference minutia number $M_i$, the primary proximate minutia numbers $M_{ik}$, and the already retained secondary proximate minutia number or numbers, such as $M_{ie0}$, then the above-described processes are repeated. If the secondary proximate minutia number being supplied, is equal to one of the reference, the primary proximate, and the already stored secondary proximate minutia numbers, then the controller 129 at once receives the next following secondary proximate minutia number from the shift register 134. In this manner, the secondary relation data of the reference minutia $M_i$ are stored in the composite minutia memory 197.

Thereafter, the controller 129 makes the first address signal 131 indicate the next following reference minutia number, clearing the ridge count register 201. The shift register 134 is already rendered. After the composite relation data of the last reference minutia $M_z$ are stored in the (buffer memory 151 or 152 of the) composite minutia memory 197, the controller 129 produces the transfer signal 149.

Referring to FIG. 21 again, the exemplified pair detecting unit 128 serves well as an example of the composite pair detecting unit 198 if the local controller 159 is slightly modified. More specifically, attention will be directed to the instant at which comparison of Formulae (5) comes to an end for the foremost primary proximate minutie $M_{ieS}$ and $M_{jeF}$ in the search and the file fingerprints with the second counter 172 renewed to a certain count. The controller 159 does not thereafter makes the address signal 162 immediately indicate the next following primary proximate minutiae of the search and the file fingerprints but access, while keeping access to the data $R_{ieS}$, $x_{ieS}$, $y_{ieS}$, and $d_{ieS}$, successively to the secondary proximate minutia data $r_{ierF}$, $x_{ierF}$, $y_{ierF}$, and $d_{ierF}$.

If the specific code is detected by the code detector 173 in place of any one of the ridge counts $r_{ierF}$, the first counter 171 is counted up. The second counter 172 is counted up by the output signal which the AND circuit 168 produces when:

$$\left. \begin{array}{l} |r_{ieS} - r_{jerF}| \leq T_r, \\ |x_{ieS} - x_{jerF}| \leq T_x, \\ |y_{ieS} - y_{jerF}| \leq T_y, \\ \text{and } |d_{ieS} - d_{jerF}| \leq T_d. \end{array} \right\} \quad (7)$$

The controller 159 thereafter makes the address signal 162 indicate each of the primary proximate minutiae $M_{ierS}$ and successively the foremost primary proximate minutia $M_{jeF}$ and the secondary proximate minutiae $M_{jerF}$. After access to the last combination of the secondary proximate minutiae $M_{ierS}$ and $M_{jerF}$, the address signal 162 is made to access the next primary proximate minutiae $M_{ifS}$ and $M_{jfF}$.

Pair Candidate List

Referring to FIG. 26, an example of the pair candidate list memory 73 (FIG. 6) has sixty-four row addresses accessible by the address signal 176 (FIGS. 17 and 21) representative of the respective search minutiae $M_0$ through $M_z$ (or $M_{63}$). The memory 73 has sixteen column addresses assigned to the file minutia numbers $M_j$ (0 through 15) which are represented also by the address signal 176 and are selected from the file minutia numbers $M_0$ through $M_z$ (for example, $M_{191}$) and rearranged as follows.

A pair candidate list is formed in the memory 73 at a fourth step $A_4$ shown in FIG. 9. Each entry specified by a search minutia number $M_i$ and one of rearranged file minutia numbers $M_j$ has a pair candidate field $M_{ij}$ and a weight field $W_{ij}$. The local similarities represented by the data signal 177 (FIGS. 17 and 21) between each search minutia $M_{iS}$ and the selected file minutiae (pairs in fact) $M_{jF}$ indicated by the address signal 176 are compared with one another by the sequence controller 69 (FIG. 6) or elsewhere. The file minutia numbers $M_{jF}$ are thereby rearranged in the descending order of the local similarity. The column addresses are accessed in this descending order. For example, the zeroth column $M_{i0}$ of the row address accessible by the search minutia number $M_i$, is for a file minutia having the highest local similarity with the search minutia $M_{iS}$.

The local similarity, now called a weight $W_{ij}$, is stored in the weight field $W_{ij}$. When only one file minutia is found for the search minutia $M_i$ during the pair detection as a single pair, data are stored in only the zeroth column. As a consequence, each row address may be loaded with the data only to a certain column address depending on the threshold supplied to the comparator 174 (FIG. 21). A specific mark is stored in the weight field $W_{ij}$ of the next following empty column address. It is possible to understand that a minutia number of the file fingerprint is stored in the column address in which the specific mark is stored in place of the weight and consequently that each row address for a search minutia $M_{iS}$ is loaded with a plurality of file minutiae which are found to be in pairs with the search minutia $M_{iS}$.

Amounts of Coordinate Adjustment

As described above, the pair candidate list memory 73 (FIGS. 6 and 26) is formed by detecting the minutia pairs based on the relatively coarse quantization step. Each search minutia is related in the pair candidate list memory 73 to at least one file minutia in the descending order of the local similarity or weight $W_{ij}$. The pair candidate list memory 73 is useful in more precisely matching the principal coordinate system selected for the search fingerprint with the principal coordinate system of each file fingerprint by deciding a set of optimum amounts of coordinate adjustment or coordinate match for the principal coordinate systems. It will be assumed that the principal coordinate system of the search fingerprint should be more precisely matched to the principal coordinate system of a file fingerprint.

Referring to FIG. 27, an example of the (coordinate) adjustment amount deciding circuit 78 (FIG. 6) is for rapidly and reliably deciding the optimum amounts as shown at a fifth step $A_5$ in FIG. 9. Decision of the optimum adjustment amounts is carried out by referring to the exemplified pair candidate list memory 73 (FIG. 26) and to either the minutia memory 127 (FIGS. 17 and 20) or more preferably back to the minutia list memory 71 which may be loaded with the precise data as exemplified in FIG. 10.

Each set of adjustment amounts consists of a pair of translation components and an angle of rotation, which will now be denoted again by x and y and afresh by $n\phi'$. It is to be noted that the angle $\phi'$ represents a preselected unit angle and that the letter n, an integer.

At the outset, the principal coordinate plane of the search fingerprint is rotated by an angle $n\phi'$ into a coordinate system, which will be called a search coordinate system. Let the position data $X_i$ and $Y_i$ of a search minutia $M_i$ be forward transformed by the rotation of the principal coordinate plane to a temporary set of position data $X_{si}$ and $Y_{si}$. Let one of the file minutiae that is given in the pair candidate list memory 73, be the j-th minutia $M_{jF}$. The position data of the minutia $M_{jF}$ will be designated by $X_{mij}$ and $Y_{mij}$, which may be read from the file minutia memory 71F of the minutia list memory 71. A pair of differences x' and y' are calculated by:

$$\left. \begin{array}{l} x' = X_{mij} - X_{si} \\ y' = Y_{mij} - Y_{si}. \end{array} \right\} \quad (8)$$

The exemplified adjustment amount deciding circuit 78 comprises a difference coordinate plane memory 211 representative of a difference coordinate plane (denoted also by the reference numeral 211) which will shortly be described more in detail. The circuit 78 forms a weight map on the difference coordinate plane 211 as will be described in the following.

Turning to FIG. 28, an example of the difference coordinate plane memory 211 has abscissa address accessible by the difference x' and ordinate address accessibly by the difference y'. An address specified by a combination of the differences x' and y' will be called a coordinate address. It is assumed that each difference $x'$ or $y'$ is from minus 8 up to plus 7, both inclusive.

Figure 29:
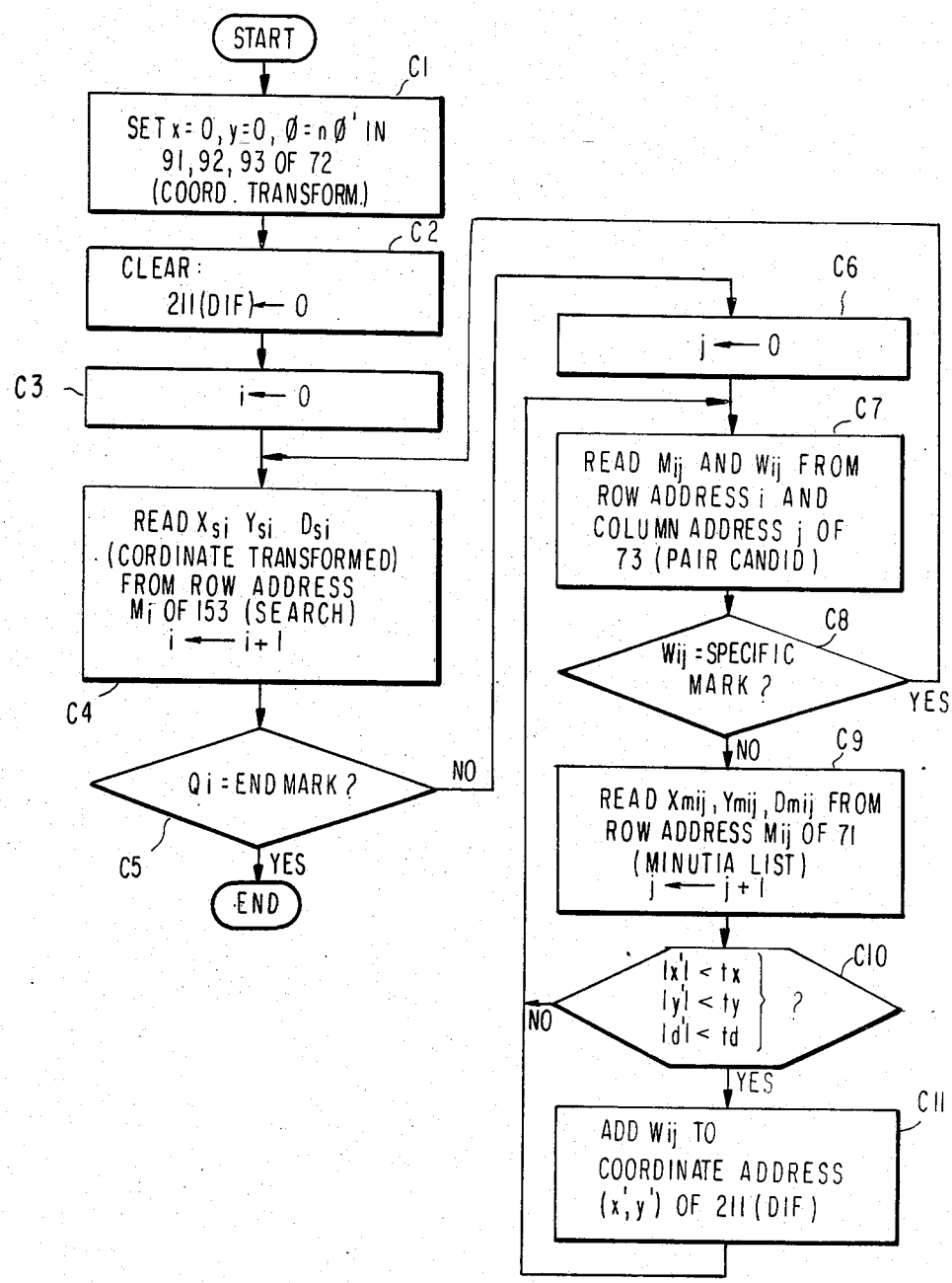
FIG. 29 shows a flow chart for use in describing operation of the adjustment amount deciding circuit of FIG. 27.

Referring to FIG. 29 in addition to FIG. 27, the control memory 75 (FIG. 6) specifies a search minutia $M_i$ to read the precise positon and direction data $X_i$, $Y_i$, and $D_i$ directly from the minutia list memory 71. As will later become clear, let the amounts of adjustment $x'$, $y'$, and $n\phi'$ be provisionally selected and stored by the control memory 75 in the registers 91 through 93 (FIG. 13) of the exemplified coordinate transforming circuit 72. For the time being, zero is used at a first step $C_1$ as $x'$ and $y'$ which are provisionally selected as the translation components x and y. The (precise) position and direction data read out of the minutia list memory 71 are transformed by the coordinate transforming circuit 72 into the search position and direction data $X_{si}$, $Y_{si}$, and $D_{si}$. Incidentally, the ROM 94 produces the values cos $(n\phi')$ and sin $(n\phi')$.

Subsequently, the control memory 75 accesses the row address allotted in the pair candidate list memory 73 to the search minutia $M_{iS}$ and a certain column address to find a file minutia $M_{jF}$ which provides a pair with the search minutia $M_{iS}$. The (precise) position and direction data of the file minutia $M_{jF}$ are read directly from the minutia list memory 71 as $X_{mij}$, $Y_{mij}$, and $D_{mij}$. Differences $x'$, $y'$, and $d'$ are calculated according to Equations (8) and to:

$$d' = D_{mij} - D_{si}. \tag{9}$$

The control memory 75 supplies the differences $x'$ and $y'$ to X and Y input terminals $X_I$ and $Y_I$ and also a control signal to a control input terminal $C_I$. When the control signal takes a binary one value, X and Y selectors 212 and 213 supply the differences $x'$ and $y'$ to the difference coordinate plane memory 211. The contents of a coordinate address specified by the differences $x'$ and $y'$ in the memory 211, is supplied to one of two input ports of an adder 214. The other input port is supplied with the weight $W_{ij}$ from the pair candidate list memory 73 through a weight input terminal $W_I$. The sum calculated by the adder 214 is stored in the coordinate address being accessed.

In this manner, the weights $W_{ij}$ are accumulated on the difference coordinate plane 211 according to the differences $x'$ and $y'$ to provide the weight map. The weights $W_{ij}$ accumulated on the respective coordinate addresses are dependent on the angle of rotation $n\phi'$. Incidentally, the exemplified abscissa and ordinate addresses are relatively coarsely quantized although the position and the direction data $X_{si}$, $X_{mij}$, and so forth are precise. The access to a coordinate address is therefore carried out by using only four consecutive more significant bits of each of the row and the column address signals.

More particularly, the control memory 75 initializes the contents of the respective coordinate addresses to zero at a second step $C_2$. At this instant, the address signal 162 is made to indicate the zeroth search minutia $M_0$ as shown at a third step $C_3$. The search position and direction data $X_{si}$, $Y_{si}$, and $D_{si}$ are calculated at a fourth step $C_4$, with the search minutiae successively specified. At a fifth step $C_5$, the minutia type $Q_i$ is checked. If the end mark is detected, the weight map is complete.

If the end mark is not detected at the fifth step $C_5$, the column address is initialized to zero at a sixth step $C_6$. The pair candidate list memory 73 is accessed by the row and the column addresses at a seventh step $C_7$. The accessed weight field $W_{ij}$ is checked at an eighth step $C_8$ whether or not the specific mark is present. If the specific mark is detected, the eighth step $C_8$ returns to the fourth step $C_4$.

If the specific mark is not detected at the eighth step $C_8$, the minutia list memory 71 is accessed at a ninth step $C_9$. The position and the direction data $X_{Mij}$, $Y_{mij}$, and $D_{mij}$ are read out and used to calculate the differences $x'$, $y'$, and $d'$ according to Equations (8) and (9). The file minutia number is increased by one.

At a tenth step $C_{10}$, the differences $x'$, $y'$, and $d'$ are checked against preselected thresholds $t_x$, $t_y$, and $t_d$. If at least one of the differences exceeds the threshold, the tenth step $C_{10}$ returns to the seventh step $C_7$. If all differences are equal to or less than the respective thresholds, the weight $W_{ij}$ is added to the content of the coordinate address at an eleventh step $C_{11}$. The steps $C_7$ through $C_{11}$ or the steps $C_7$ through $C_9$ and $C_{11}$ are repeated. In the weight map exemplified in FIG. 28, the accumulated weights are exemplified by numbers selected from 1 through 8.

Turning to FIG. 30, a factor table 216 is exemplified for use in searching a specific coordinate address at which the accumulated weight is maximum. The table 216 is preferred in order to exclude a coordinate address at which the accumulated weight shows an unduly high value. The table 216 is used as will presently be described for each coordinate address of search and gives factors to be multiplied by the weights accumulated on nine coordinate addresses which form a matrix of three rows and three columns with the coordinate address of search at the center.

Referring to FIG. 31 besides FIG. 27, an initial value of zero is set at a first step $D_1$ in first through third registers 221, 222, and 223, a maximum register 225, and first and second register files 226 and 227. Another initial value of minus 8 is set in X and Y registers 228 and 229 to indicate a start point of search (the leftmost and lowest coordinate address of the difference coordinate plane 211). A binary zero value is given to the control signal ($C_I$), responsive to which the selectors 212 and 213 make the contents of the X and Y registers 228 and 229 access the weight map and responsive to which the difference coordinate plane memory 211 is adapted to read out.

The first register file 226 is fed directly from the difference coordinate plane memory 211. The second register file 227 is fed from the first register file 226. The register files 226 and 227 are accessed by the Y register 229.

The adjustment amount deciding circuit 78 comprises first through third selectors 231, 232, and 233. A timing signal input terminal, depicted separately at 234 and 235, is supplied with a timing signal from the control memory 75. The timing signal specifies first and second timings $T_1$ and $T_2$ by, for example, logic zero and one values, respectively.

A first adder 236 is for adding twice the data selected by the second selector 232 and the data selected by the third selector 233. A second adder 237 is for adding the data supplied from the first adder 236 and the data selected by the first selector 231 to supply the sum to the first register 221 and also to a comparator 238. The sum is furthermore directed towards the maximum register 225.

During the first timing $T_1$, the registers 221 through 223 are enabled. Furthermore, the selectors 231 through 233 are made to select the data supplied directly from the difference coordinate plane memory 211 and the data supplied from the register files 226 and 227, respectively. The following processes are therefore carried out concurrently at a second step $D_2$.

$$\left.\begin{aligned} RK1 &\leftarrow DIF(DX, DY) + 2[RF1(DY)] \\ &\quad + RF2(DY), \\ RK2 &\leftarrow RK1, \\ RK3 &\leftarrow RK2, \\ RF1(DY) &\leftarrow DIF(DX, DY), \\ \text{and } RF2(DY) &\leftarrow RF1(DY), \end{aligned}\right\} \quad (10)$$

where DX and DY, DIF, RK1 through RK3, and RF1 and RF2 represent contents of the X and Y registers 228 and 229, of the difference coordinate plane memory 211, of the registers 221 through 223, and of the register files 226 and 227, respectively. The data on the right-hand sides represent the contents before renewal and those on the left-hand sides, renewed data.

During the second timing $T_2$, the registers 221 through 223 are disabled. The selectors 231 through 233 are made to select the data fed from the registers 221 through 223, respectively. As a result, the second adder 237 produces a sum (RK1+2[RK2]+RK3). The comparator 238 compares the sum with the content (MDIF) of the maximum register 225. If the sum is less than the content, the comparator 238 enables an AND circuit 239 for the logic one timing signal. An input port of the maximum register 225 is therefore enabled. The following processes are simultaneously carried out at a third step $D_3$.

$$\left.\begin{aligned} MDIF &\leftarrow RK1 + 2[RK2] + RK3, \\ DX' &\leftarrow DX, \\ \text{and } DY' &\leftarrow DY, \end{aligned}\right\} \quad (11)$$

where DX' and DY' represent the contents of X' and Y' registers 241 and 242.

Thereafter, the control memory 75 sends another timing signal to an input terminal 243 to enable inputs to the X and Y registers 228 and 229. At a fourth step $D_4$, a first one-adder 246 adds one in general to the content DY of the Y register 229. Only when the content DY represents seven, the one-adder 246 supplies a carry to a second one-adder 247, which adds one to the content DX of the X register 228. When the content DX becomes equal to seven, the second one-adder 247 delivers a carry to an end output terminal 248. The latter carry is detected by the control memory 75 as an end of the search at a fifth step $D_5$. Before detection of the latter carry, the processes return from the fifth step $D_5$ to the second step $D_2$. When the latter carry is detected, the contents DX' and DY' are read out of the X' and Y' registers 241 and 242 as the translation components x and y at a sixth step $D_6$.

In order to facilitate an understanding of the search, let it be assumed that the contents DX and DY of the X and Y registers 228 and 229 are for the abscissa address x' of 3 and the ordinate address y' of 5 of the difference coordinate plane 211 exemplified in FIG. 28. During the first timing $T_1$, Formulae (10) shows that the contents RF1(5), RF2(5), and RK1 through RK3 are equal to DIF(2, 5), DIF(1, 5), (DIF(3, 5)+2[DIF(2, 5)]+DIF(1, 5)), (DIF(3, 4)+2[DIF(2, 4)]+DIF(1, 4)) or the content RK1 which the first register 221 had at the previous instant when DY was equal to 4, and (DIF(3, 5)+2[DIF(2, 3)]+DIF(1, 3)) or the content RK1 which the first register 221 had at the next previous instant when DY was equal to 3, respectively.

In the course of the second timing $T_2$, processes are carried out according to Formulae (11). The second adder 237 gives a sum which is equal to:

$$\begin{aligned} &DIF(3, 5) + 2[DIF(2, 5)] + DIF(1, 5) + \\ &\quad 2[DIF(3, 4)] + 4[DIF(2, 4)] + 2[DIF(1, 4)] + \\ &\quad DIF(3, 3) + 2[DIF(2, 3)] + DIF(1, 3), \end{aligned} \quad (12)$$

which shows that the above-described search is carried out by multiplying nine accumulated weights by the factors of the factor table 216 (FIG. 30) and by summing up the products. It is to be noted in connection with Equation (12) that the greatest factor of 4 is multiplied to DIF(2, 4), namely, the weight accumulated on the coordinate address (2, 4) rather than the coordinate address (3, 5) being checked. The coordinate address on which the maximum weight is accumulated, is therefore given by (X'−1, Y'−1). The optimum amounts of coordinate adjustment are obtained by alternatingly repeating the above-described accumulation and search.

Referring afresh to FIG. 32 and again to FIG. 27, the working area 74 (FIG. 6) is for storing the unit angle of rotation $\phi'$, the integers n, the maximum value of the integer N, an angle of rotation $\phi$ as will shortly be described, (X'−1) and (Y'−1) previously obtained from the contents X' and Y' of the X' and Y' registers 241 and 242, and that content read out of the maximum register 225 which will now be called a previous maximum and denoted by MDIF'.

At the outset, the control memory 75 sets the unit angle $\phi'$ and the maximum integer N in the working area 74 at a first step $E_1$. The memory 75 gives an initial value of zero to the integer n and also to the previous maximum MDIF' at a second step $E_2$.

The control memory 75 makes the exemplified adjusting amount deciding circuit 78 (FIG. 27) form a weight map at a third step $E_3$ and then the search at a fourth step $E_4$. Responsive to the end of search signal, the memory 75 reads the maximum register 225 and compares the maximum MDIF with the previous maximum MDIF' at a fifth step $E_5$. When the read-out maximum MDIF is greater than the previous maximum MDIF', the control memory 75 substitutes the former for the latter at a sixth step $E_6$. Furthermore, the memory 75 reads the X' and Y' registers 241 and 242 and substitutes (X'−1) and (Y'−1) for the previously read-out values in the working areas 75 and rewrites the angle of rotation $\phi$ by the angle of rotation $n\phi'$ by which the new maximum is obtained.

The control memory 75 changes the sign of the integer n at a seventh step $E_7$. If the read-out maximum MDIF is equal to or less than the previous maximum MDIF', the step $E_5$ jumps to the step $E_7$. As an eighth step $E_8$, the memory 75 checks whether or not the new integer is equal to or greater than zero. If not, the step $E_8$ returns to the step $E_3$. If the new integer is equal to or greater than zero, the memory 75 checks whether or not the new integer is equal to the maximum integer N at a ninth step $E_9$. If not, the memory 75 adds one to the new integer at a tenth step $E_{10}$ and makes the process return to the second step $E_2$. If the maximum integer N is reached, the optimum amounts are obtained.

It may be that the maximum MDIF eventually obtained as a result of the above-described steps, is found at a sixth step $A_6$ of FIG. 9 to be less than a preselected threshold. In this event, the control memory 75 judges that the file fingerprint being matched, is different from the search fingerprint. In other words, the matching is unsuccesful. The memory 75 suspends the matching and informs the matching control device 55 (FIG. 1) of the fact. Only when the eventually obtained maximum MDIF exceeds the threshold, the memory 75 transfers the precise position and direction data and so forth from the minutia list memory 71 (FIG. 6) to the precise matcher 57 (FIG. 2 or 3) through a bus 249 (FIG. 2) or the buses 64 and 90 (FIG. 3) at a seventh step $A_7$ of FIG. 9. The transfer of the position and direction data and the like is preferably carried out with reference to the pair candidate list memory 73 and through the coordinate transforming circuit 72 in which the optimum amounts of adjustment are set for the forward transformation.

Precise Matcher

Referring back to FIG. 7, the first minutia list is transferred as a second minutia list in the second minutia list memory 81. As will presently become clear, the minutiae used in the precise matcher 57 are those listed in the pair candidate list memory 73 and the (primary) proximate minutiae of the search and the file minutiae given in the pair candidate list. It will be assumed for convenience of description that the minutia list memory 81 is loaded with the second minutia list in the form shown in FIG. 18 together with the identification numbers of the search and the file fingerprints being dealt with. The pair candidate list memory 73 is rendered empty by transfer of the pair candidate list preliminarily to the pair candidate list memory 83. The region pattern list is transferred either from the first minutia list memory 71 or directly from the data storing device 54 (FIG. 1) to the region pattern list memory 87.

At an eighth step $A_8$ depicted in FIG. 9, the sequence controller 79 (FIG. 7) reads the position and the direction data of the pair candidates from the minutia list memory 81 with reference to the pair candidate list memory 83. The read out is carried out directly without the use of the coordinate transforming circuit 82. This is because the data are stored in the minutia list memory 81 with the coordinates optimally matched at the seventh step $A_7$. The read-out data are checked against thresholds which are stricter than those used in Formulae (5). Comparison defined by Formulae (6) and (7) is no more necessary. The sequence controller 79 selects those of the pair candidates together with the weights, which are within the stricter thresholds.

Referring now to FIG. 33, the selected search minutiae will be denoted by $N_s$. The file minutia which is in a stricter pair (the stricter pair being possibly still "pairs") with each selected search minutia $N_s$, will be designated by $M_f$ where f represents a strictly selected one of 0 through z for the file fingerprint. The weights which are preliminarily moved to the pair candidate list memory 83, remain only for the stricter pairs after the eighth step $A_8$ (FIG. 9).

At a ninth step $A_9$ of FIG. 9, the pair candidate list memory 83 (FIG. 7) is modified as regards the remaining weights. As described above, the proximate minutiae $N_{sr}$ and $M_{fr}$ are stored in the minutia list memory 81. The sequence controller 79 (FIG. 7) successively accesses the minutia list memory 81 by the minutia numbers $N_s$ and $M_f$ to read the proximate minutia numbers $N_{sr}$ and $M_{fr}$. The controller 79 searches the pair candidate list memory 83 for the proximate minutiae $M_{fr}$ in the row address assigned to each proximate minutia $N_{sr}$. If one is found as depicted at $M_f$ (FIG. 33), the file minutia $M_f$ is in stricter pair with the proximate search minutia $N_{sr}$ being dealt with. The weight for the pair $N_{sr}$ and $M_{f}$ is added to the weight for the pair $N_s$ and $M_f$ to provide a modified weight for the pair $N_s$ and $M_f$.

In each row address of the pair candidate list memory 83, the pairs are rearranged in the descending order of the modified weights. The modified weights so rearranged, will be denoted by $W_{st}$ where t represents 0, 1, . . . .

Referring to FIG. 34, the pair list memory 86 (FIG. 7) comprises search and file pair list memories 86S and 86F. The search pair list memory 86S has row addresses assigned to (strictly selected) search minutiae $N_1$ through $N_S$ as will presently be described. Each row address $N_s$ has a pair field $M_f$ and an evaluation field $V_s$. The file pair list memory 86F likewise has row addresses allotted to (strictly selected) file minutiae $M_1$ through $M_F$. Each row address $M_f$ has a pair field $N_s$ and an evaluation field $V_f$.

At a tenth step $A_{10}$ of FIG. 9, the pair list memory 86 is formed as follows. At the outset, the evaluation fields $V_s$ and $V_f$ are initialized to a negative value. The pair candidate list memory 83 is repeatedly scanned from the row address $N_1$ to the row address $N_S$. From the pair $(N_s, M_{s0})$ having the maximum modified weight and consequently stored in the zeroth column, the modified weight $W_{s0}$ is read out. A difference between the maximum modified weight $W_{s0}$ and the next following modified weight $W_{s1}$ is calculated.

Reliability of the pair is decided for each pair $(N_s, M_{s0})$ in consideration of the modified weight $W_{s0}$ and the difference. The pairs of each row address are rearranged in the descending order of the reliability. The pairs $(N_s, M_{s0})$ are renumbered into pairs $(N_s, M_f)$ or $(N_1, M_1), \ldots, (N_s, M_s), \ldots, (N_f, M_f), \ldots$ (the suffix s being not necessarily less than the other suffix f). The modified weight, now called evaluations $V_1, \ldots, V_s, \ldots, V_f, \ldots$, are substituted for the negative value in the respective evaluation fields $V_1, \ldots, V_s, \ldots, V_f, \ldots$. The pairs remaining in the pair candidate list memory 83 are erased.

Turning to FIGS. 35 and 36, one of proximate minutiae of a search minutia $N_s$ (renumbered) is depicted at $N_{sr}$ together with a file minutia $M_f$ (also renumbered) in a pair for the search minutia $N_s$ in the manner depicted in FIG. 33. Like the modification of the pair candidate list memory 83, the pair list memory 86 is modified in a former half of an eleventh step $A_{11}$ illustrative of decision of the evaluation in FIG. 9.

At first, the row address $N_s$ is checked in the search pair list memory 86S. If the evaluation $V_s$ is positive (not the initial value), the file minutia number $M_f$ of the pair is read out. The search minutia $N_s$ is used to access the minutia list memory 81 (FIG. 7) to read the proximate minutia numbers $N_{sr}$. Each proximate minutia $N_{sr}$ is used to check the search pair list memory 86S whether or not the evaluation field $V_{sr}$ is positive. If positive, the evaluation $V_{sr}$ is added to the evaluation $V_s$. The evaluation $V_s$ is rewritten by the sum, which will be called a modified evaluation and again denoted by $V_s$. The other new address of the pair list memory 86 are similarly dealt with.

Further turning to FIGS. 37 and 38, a file minutia $M_f$ is depicted together with a proximate minutia $M_{fr}$. The proximate minutiae $M_{fr}$ are read from the minutia list memory 81 as before.

The modification of the pair list memory 86 is followed by relaxation of the evaluation in the latter half of the eleventh step $A_{11}$ of FIG. 9. During modification of the pair list memory 86, the negative initial value may be read from the evaluation field $V_f$ of the row address for the minutia $M_f$. The position data of the minutia $M_f$ are read directly from the minutia list memory 81 and used to access the region pattern list memory 87. If the region pattern list memory 87 indicates that the minutia $M_f$ is in the unclear area (FIG. 4), the negative initial value is rewritten in the evaluation field $V_f$ to zero which is indicative of "don't care." If the minutia $M_f$ is in the file fingerprint area, the negative initial value is left as it stands.

The relaxation of the evaluation is carried out also for the search minutiae $N_s$. In this connection, attention should be directed to the facts that the position and the direction data of the search minutiae are given by a coordinate system into which the principal coordinate system for the search fingerprint is forwardly transformed on loading the minutia list memory 81 by the use of the optimum amounts of coordinate adjustment and that the pattern region list of the search fingerprint is given in the pattern region list memory 87 by the principal coordinate system. The coordinate transforming circuit 82 should therefore be used on reading the position data from the minutia list memory 81 to access the region pattern list memory 87. For this purpose, the registers which correspond to the registers 91 through 93 in the circuit 82, should preliminarily be loaded with the optimum amounts when the fingerprint matching is transferred from the leading matcher 56 to the precise matcher 57. A search minutia for which the negative initial value is left untouched in the evaluation field, will be denoted by $N_{s'}$.

The relaxation of the evaluation is continued. The ridge count $R_{fr}$ (FIG. 36) which the file minutia $M_f$ has relative to each proximate minutia $M_{fr}$, is read from the minutia list memory 81. If the ridge count $R_{fr}$ is equal to zero, the minutiae $M_f$ and $M_{fr}$ are very closely positioned on the file fingerprint and will be called close minutiae. The direction data $D_f$ and $D_{fr}$ are checked as will shortly be described, whether or not the directions $D_f$ and $D_{fr}$ are opposite to each other. If the negative initial value is left also in the evaluation field $V_{fr}$, the negative initial values are changed in the evaluation fields $V_f$ and $V_{fr}$ to zero indicative of "don't care" as before. The process is carried out also for the search minutiae $N_{s'}$. The direction data are checked in the exemplified precise matcher 57 by the arithmetic unit 89 under the control of the control memory 85 and in cooperation with the working area 84.

Figure 39:
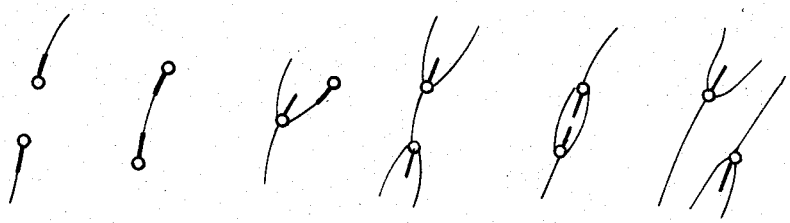
FIG. 39, drawn below

FIG. 39 exemplifies several combinations of close minutiae having opposite directions. It is to be noted that the direction of a bifurcation is depicted opposite to that defined in the above-referenced Asai Patent.

Figure 40:
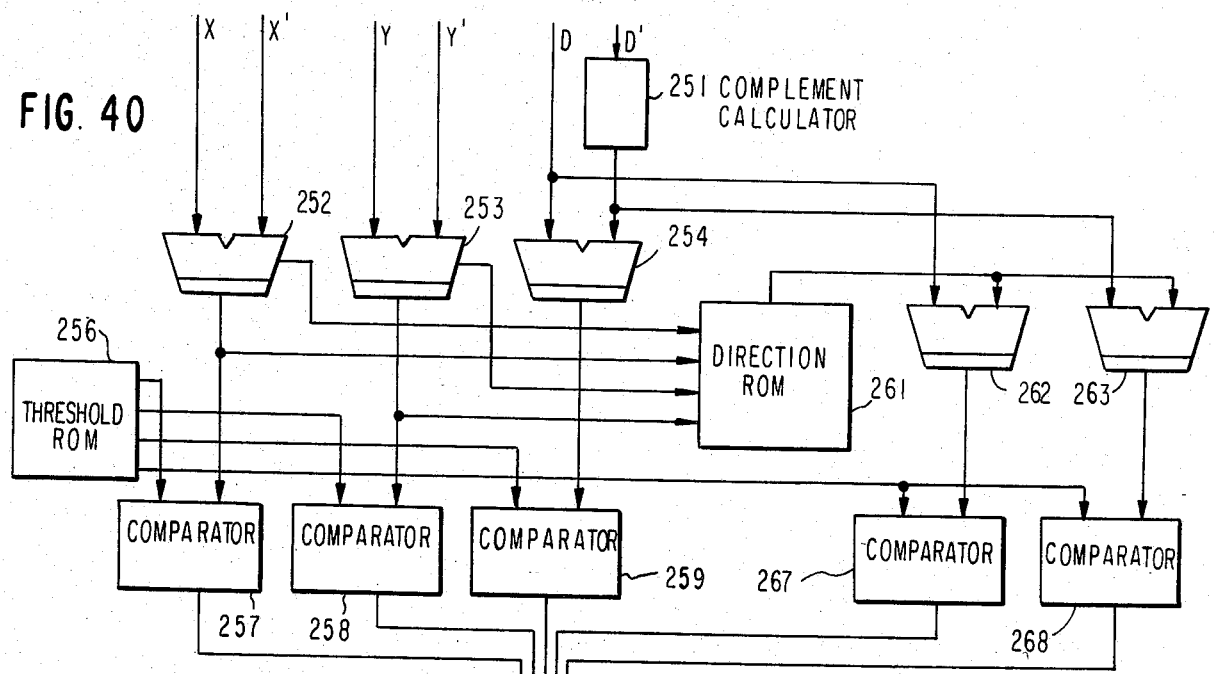
FIG. 40 is a block diagram of a direction checking circuit for use in a precise matcher of the type exemplified in FIG. 7.

Referring to FIG. 40, a direction checking circuit is for use in place of the arithmetic unit 89 in solely checking the directions. The position and the direction data of the close minutiae $M_f$ and $M_{fr}$ or $N_{s'}$ and $N_{s'r}$ will be denoted merely by X, Y, and D and X', Y', and D'. A complement calculator 251 is supplied with the direction datum D' to produce a direction datum $D_0$ opposite to the direction D', namely, a sum of D' and $\pi$. The absolute values of differences between X and X', between Y and Y', and between D and $D_0$ are calculated by absolute difference calculators 252, 253, and 254. A threshold ROM 256 is for supplying comparators 257, 258, and 259 with thresholds for comparison with the respective absolute values of differences.

Attention should be directed to the direction data D and $D_0$ so that the angle of $\pi$ radians may be given by the most significant bit. This is in order to insure the difference $(D - D_0)$ as regards the periodicity of angle.

A direction ROM 261 is accessed by the differences $(X - X')$ and $(Y - Y')$ or by the absolute values of the differences and the sign bits of the respective differences. The ROM 261 is preliminarily loaded with angles $\phi$ (the same symbol being again used) given by:

$$\phi = \arctan[(Y' - Y)/(X' - X)].$$

The absolute values of differences between the direction datum D and the angle $\phi$ and between the direction datum $D_0$ and the angle $\phi$ are calculated by additional absolute difference calculators 262 and 263. The threshold ROM 256 supplies additional comparators 267 and 268 with an additional threshold for comparison with the absolute values calculated by the calculators 262 and 263. Attention should be directed to the facts that each difference is nearly equal to zero and that the most significant bit of the difference would correspond to $\pi/2$.

An AND gate 269 is supplied with the results of comparison from the comparators 257 through 259, 267, and 268. Only when all results show that the absolute values of the differences are not greater that the thresholds, the AND gate 269 supplies the sequence controller 79 (FIG. 7) with an output signal indicative of the fact that the close minutiae have opposite directions.

Figure 41:
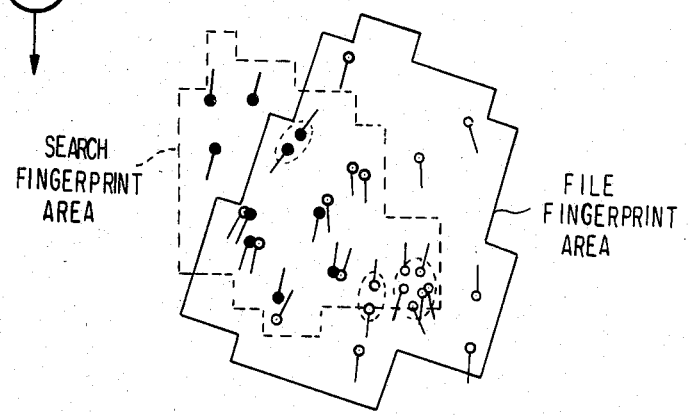
FIG. 41 exemplifies a search and a file fingerprint area together with minutiae thereof.

Referring to FIG. 41, small circles show file minutiae $M_f$ and $M_{f'}$. Dots show search minutiae $N_s$ and $N_{s'}$. It may be found that close minutiae do not have opposite directions. In this event, the minutia list memory 81 is accessed by the minutia numbers $M_f$ and $M_{fr}$ to read the concentrations $C_f$ and $C_{fr}$. If the concentrations $C_f$ and $C_{fr}$ have a great value as compared with a threshold, the evaluation field $V_f$ and $V_{fr}$ are rewritten to zero indicative of "don't care." Summarizing, the relaxation of the pair list memory 86 is carried out as regards the minutiae which are not in an area common to the search and the file fingerprint areas. The relaxation is furthermore carried out in connection with those of the close minutiae which either have opposite directions or are densely positioned. Such close minutiae are enclosed in FIG. 41 with dashed-line curves.

Fingerprint Matching

The precise matcher 57 carried out precise matching between a search fingerprint and one of the file fingerprints at a time by eventually calculating a match score (degree of match) q as indicated at a twelfth step $A_{12}$ in FIG. 9. More particularly, the sequence controller 79 (FIG. 7) reads the pair list memory 86 and makes the control memory 85 control the arithmetic unit 89. Using the working area 84, the arithmetic unit 89 calculates the match score q in accordance with:

$$q = \left(\overset{S}{\Sigma} V_s \times \overset{F}{\Sigma} V_f\right) /(S \times F),$$

where S and F are representative of the numbers of search and file minutiae which are present in the common area described in conjunction with FIG. 41. The sequence controller 69 compares the match score q with a threshold at a thirteenth step $A_{13}$ of FIG. 9.

If the match score q is less than the threshold, the precise matching is at once suspended. The precise matcher 57 under consideration is ready for precise matching for another file fingerprint.

If the match score q is not less than the threshold, the identification number of the file fingerprint is stored in the candidate fingerprint list memory 88 (FIG. 7) at a fourteenth step $A_{14}$ of FIG. 9 together with the match score q. In a fingerprint matching system depicted in FIG. 1 and comprising leading and precise matchers, the match scores q obtained for a search fingerprint are compared with one another. The matching control device 55 is informed of the identification number of the file fingerprint that has the maximum of the match scores q. The matching control device 55 sends the identification number to the data control and processing device 53, which produces a result signal indicative of the identification data of the file fingerprint. Meanwhile, the data of another search fingerprint are transferred to the fingerprint matching devices 51's.

Destination Deciding Circuit

Figure 42:
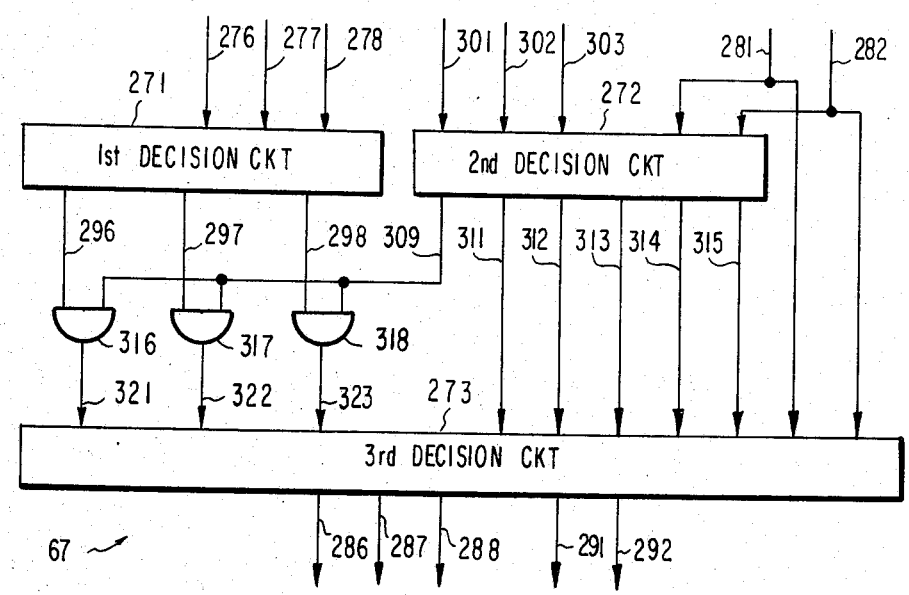
FIG. 42 is a block diagram of a destination deciding circuit for use in the control unit depicted in FIG. 5.

Referring to FIG. 42, an example of the destination deciding circuit 67 (FIG. 5) is specifically useful in the fingerprint matching device 51 exemplified in FIG. 3 and comprises first through third decision circuits 271, 272, and 273. The first decision circuit 271 is supplied with first through third primary busy signals 276, 277, and 278 which indicate that the first through the third leading matchers 56a, 56b, and 56c are busy. First and second secondary busy signals 281 and 282 indicative of the facts that the first and the second precise matchers 57a and 57b are busy, are delivered to the second and the third decision circuits 272 and 273. The third decision circuit 273 produces first through third primary allowance signals 286, 287, and 288 and first and second secondary allowance signals 291 and 292 which allow transfer of data to the first through the third leading matchers 56a, 56b, and 56c and to the first and the second precise matchers 57a and 57b, respectively. The primary busy and allowance signals 276 through 278 and 286 through 288 are transmitted through the bus 90 (FIGS. 2 and 3). The secondary busy and allowance signals 281, 282, 291, and 292 are transmitted through the bus 64.

When a command indicative of transfer of data from the data storing device 54 (FIG. 1) to the leading or the precise matchers 56's or 57's, is supplied through the bus 62, the device interface circuit 63, and the control circuit 66, the first decision circuit 271 produces first through third primary decision signals 296, 297, and 298. According to logic operation, the signals 296 through 298 are produced when the first through the third primary busy signals 276 through 288 are absent, respectively.

When supplied with first through third transfer request signals 301, 302, and 303 from the first through the third leading matchers 56's through the bus 90, the second decision circuit 272 produces an inhibit signal 309 and first through fifth secondary decision signals 311, 312, 313, 314, and 315. The inhibit signal 309 is produced either (1) when at least one of the transfer request signals 301 through 303 is present and furthermore when the secondary busy signals 281 and 282 are both present or (2) when all transfer request signals 301 through 303 are absent. The first secondary decision signal 311 is produced in the presence of the first transfer request signal 301. The second secondary decision signal 312 is produced when the second transfer request signal 302 is present in the absence of the first transfer request signal 301. The third secondary decision signal 313 is produced when the third transfer request signal 303 is present in the absence of the first and the second transfer request signals 301 and 302. The fourth and the fifth secondary decision signals 314 and 315 are produced when at least one of the transfer request signals 301 through 303 is present in the absence of the first and the second secondary busy signals 281 and 282, respectively.

First through third AND circuits 316, 317, and 318 are supplied with the inhibit signal 309 in common. Responsive to the first through the third primary decision signals 296 through 298, the first through the third AND circuits 316 through 318 produce first through third ternary dceision signals 321, 322, and 323, respectively. The third decision circuit 273 includes a flip-flop (not shown) for selecting either of the first and the second precise matchers 57 when both are idle. It will be assumed that the flip-flop produces first and second quaternary decision signals 326 and 327 (not shown) to select the first and the second precise matchers 57, respectively.

The first primary allowance signal 281 is produced when at least one of the first secondary and ternary decision signals 311 and 321 is present. The second primary allowance signal 287 is produced when at least one of the second secondary and ternary decision signals 312 and 322 is present. The third primary allowance signal 288 is produced when at least one of the third secondary and ternary decision signals 313 and 323 is present.

The first secondary allowance signal 291 is produced when the fourth secondary decision signal 314 is present and moreover either when the first secondary busy signal 281 is absent or when the first quaternary decision signal 316 is present in the absence of the second secondary busy signal 282. The second secondary allowance signal 292 is produced when the fifth secondary decision signal 315 is present and furthermore either when the second secondary busy signal 282 is absent or when the second quaternary decision signal 327 is present in the absence of the first secondary busy signal 281.

Closing Paragraph

While the preferred embodiments of this invention and modifications thereof have so far been described with reference to the accompanying drawing, it will now readily be possible for one skilled in the art to carry this invention into effect in various other manners. For example, modification of the pair candidate list memory 83 and of the pair list memory 86 should preferably be carried out for all combinations of the proximate minutiae. The memories, such as the minutia memories 153 and 154, may be loaded with the data in other ways. Attention should finally be directed to the fact that it is possible to implement the sequence controllers 69 and 79, the pair detecting unit 128 or 198, and the like by microcomputers as will readily be understood from the description of operation.

What is claimed is:

1. A method of deciding a degree of match between a search and a file fingerprint, comprising the steps of:

selecting preliminarily matched coordinate systems on the respective fingerprints;

selecting a search and a file fingerprint area where minutiae are clear;

forming a minutia list showing those original position and direction data of the minutiae which are given by the respective preliminarily matched coordinate systems, said minutia list furthermore showing those relation data of the minutiae which are substantially independent of said preliminarily matched coordinate systems;

selecting pairs of minutiae from the minutiae of the respective fingerprints by comparing the original position and direction data given for the respective fingerprints and furthermore comparing the relation data given for the respective fingerprints;

forming a pair candidate list which shows said pairs of minutiae as pair candidates, respectively;

deciding optimum amounts of coordinate match by referring to the original position and direction data of the minutiae of said pair candidates, said optimum amounts being for precisely matching said preliminarily matched coordinate systems with each other;

transforming the original position and direction data given by a predetermined one of said preliminarily matched coordinate systems for the minutiae of said pair candidates into transformed position and direction data given by a transformed coordinate system into which said predetermined one of the preliminarily matched coordinate systems is transformed by said optimum amounts;

forming a pair list by referring to said minutia list, said pair candidate list, and said search and said file fingerprint areas, said pair list showing precise pairs of minutiae selected from those minutiae of said pair candidates which are present in an area common to said search and said file fingerprint areas, the minutiae of each precise pair having a precise local similarity between the transformed position and direction data and the original position and direction data given by a different one of said preliminarily matched coordinate systems and between the relation data, said different one of the preliminarily matched coordinate systems being different from said predetermined one of the preliminarily matched coordinate systems, said pair list furthermore showing evaluations, each evaluation being representative of said local similarity; and deciding said degree of match using the minutiae of said pair list and by referring to said evaluations.

2. A method as claimed in claim 1, wherein said minutia list forming step comprises the steps of:

selecting primary local coordinate systems which having primary local origins at the respective minutiae;

selecting primary proximate minutiae with reference to the respective primary local coordinate systems, said primary proximate minutiae being proximate to the respective local origins;

deciding primary data of said primary proximate minutiae with reference to the respective primary coordinate systems;

selecting secondary local coordinate systems which have secondary local origins at the respective primary proximate minutiae;

selecting secondary proximate minutiae with reference to the respective secondary local coordinate systems, said secondary proximate minutiae being proximate to the respective secondary local origins;

deciding secondary data of said secondary proximate minutiae with reference to the respective primary local coordinate systems; and listing said primary and said secondary data as said relation data.

3. A method as claimed in claim 1, wherein said pair list forming step comprises the steps of:

forming an additional minutia list which shows said transformed position and direction data, the original position and direction data given by said different one of the preliminarily matched coordinate systems for the minutiae of said pairs of candidates, and the relation data of the minutiae of said pair candidates; and forming said pair list by referring to said additional minutia list, said pair candidate list, and said search and said file fingerprint areas, the transformed position and direction data given in said additional minutia list being used in evaluating said precise local similarity.

4. A fingerprint matching device for deciding a degree of match between a search and a file fingerprint, comprising:

minutia list producing means (71, 72, 81) for producing a minutia list showing those original position and direction data of minutiae which are given by preliminarily matched coordinate systems selected on said search and said file fingerprints, respectively, said minutia list furthermore showing those relation data of said minutiae which are substantially independent of said preliminarily matched coordinate systems;

fingerprint area memory means (87) for memorizing a search and a file fingerprint area where the minutiae are clear;

selecting means (77) coupled to said minutia list producing means for selecting pairs of minutiae from the minutiae of the respective fingerprints, said pairs of minutiae having similar original position and direction data given for the respective fingerprints and furthermore similar relation data given for the respective fingerprints;

pair candidate list memory means (73) coupled to said selecting means for memorizing a pair candidate list which shows said pairs of minutiae as pair candidates, respectively;

optimum amount deciding means (78, 75) coupled to said minutia list producing means and said pair candidate list memory means for deciding optimum amounts of coordinate match by referring to the original position and direction data of the minutiae of said pair candidates, said optimum amounts being for precisely matching said preliminarily matched coordinate systems with each other;

coordinate transforming means (72) coupled to said minutia list producing means, said pair candidate list memory means, and said optimum amount deciding means for transforming a predetermined one of said preliminarily matched coordinate systems into a transformed coordinate system by said optimum amounts, said coordinate transforming means thereby transforming the original position and direction data given by said predetermined one of the preliminarily matched coordinate systems for the minutiae of said pair candidates into transformed position and direction data;

pair list memory means (86, 83) coupled to said minutia list producing means, said pair candidate list memory means, and said fingerprint area memory means for memorizing a pair list showing precise pairs of minutiae selected from those minutiae of said pair candidates which are present in an area common to said search and said file fingerprint areas, the minutiae of each precise pair having a precise local similarity between the transformed position and direction data and the original position and direction data given by a different one of said preliminarily matched coordinate systems and between the relation data, said different one of the preliminarily matched coordinate systems being different from said predetermined one of the preliminarily matched coordinate systems, said pair list furthermore showing evaluations, each evaluation being representative of said local similarity; and deciding means (89) coupled to said pair list memory means for deciding said degree of match by using the minutiae of said pair list and by referring to said evaluations.

5. A fingerprint matching device as claimed in claim 4, wherein said minutia list producing means comprises:

first means (in 197) for producing a remaining part of said minutia list, said part showing the original position and direction data given by the respective preliminarily matched coordinate systems and furthermore showing that part of said relation data which gives primary data represented by primary local coordinate systems selected to have primary local origins at the respective minutiae, said primary data being given to primary proximate minutiae with reference to the respective primary local coordinate systems, said primary proximate minutiae being selected proximate to the respective primary local origins with reference to the respective primary local coordinate systems; and second means (in 197) for producing a remaining part of said minutia list, said remaining part showing that remaining part of said relation data which gives secondary data represented by the respective primary local coordinate systems, said secondary data being given to secondary proximate minutiae which are selected proximate to the respective primary proximate minutiae with reference to the respective ones of secondary local coordinate systems selected to have secondary local origins at the respective primary proximate minutiae.

6. A fingerprint matching device as claimed in claim 5, wherein:

said primary proximate minutiae are selected proximate to each primary local origin in a predetermined number of sectors which have a common vertex at said each primary local origin and into which the primary local coordinate system having said each primary local origin is divided;

said secondary proximate minutiae being selected proximate to each of the secondary local origins located at the respective primary proximate minutiae selected for said each primary local origin in a prescribed number of sectors which have a common vertex at said each of the secondary local origins and into which the secondary local coordinate system having said each of the secondary local origins is divided;

said secondary data comprising ridge counts between said each primary local origin and the respective secondary proximate minutiae which are selected for the secondary local origins located at the respective primary proximate minutiae selected for said each primary local origin.

7. A fingerprint matching device as claimed in claim 4, wherein:

said minutia list producing means comprises:

first minutia list producing means (71, 72) for producing a first minutia list which shows the original position and direction data given by the respective preliminarily matched coordinate systems and the relation data of the respective minutiae; and second minutia list producing means (81) coupled to said coordinate transforming means and said pair candidate list memory for producing a second minutia list which shows said transformed position and direction data, the original position and direction data given by said different one of the preliminarily matched coordinate systems for the minutiae of said pair candidates, and the relation data for the minutiae of said pair candidates;

said selecting means being coupled to said first minutia list producing means;

said optimum amount deciding means being coupled to said first minutia list producing means and said pair candidate list memory means;

said coordinate transforming means being coupled to said first minutia list producing means, said pair candidate list memory means, and said optimum amount deciding means;

said pair list memory means being coupled to said second minutia list producing means, said pair candidate list memory means, and said fingerprint area memory means, the transformed position and direction data used in giving said precise local similarity being those given by said second minutia list producing means.

8. A fingerprint matching device as claimed in claim 4, wherein said relation data comprise a ridge count between each minutia of said search and said file fingerprint and a minutia which is proximate to said each minutia in said search and said file fingerprints.

9. A fingerprint matching device as claimed in claim 4, wherein:

said pair candidate list memory means is for memorizing the pair candidate list which furthermore shows a local similarity measure for each pair candidate;

said optimum amount deciding means uses the local similarity measures for the respective pair candidates on deciding said optimum amount;

said pair list memory means determines said precise local similarity by using the local similarity measures selected for the respective precise pairs.

10. A fingerprint matching device as claimed in claim 9, the pair candidate consisting of a first and a second minutia, wherein said optimum amount deciding means comprises:

a two-dimensional memory (211) supplied with the local similarity measures for the respective pair candidates from said pair candidate list memory means;

means (212-214) for accumulating the local similarity measures in said two-dimensional memory according to coordinate increment sets and angular increments, each coordinate increment set representing differences between the original position data of the first minutia of each pair candidate and the transformed position data into which the original position data of the second minutia of said each pair candidate are transformed when each angular increment is given to the preliminarily matched coordinate system selected for the fingerprint including the second minutia of said each pair candidate; and means (75) for giving said optimum amounts by the coordinate increment set and the angular increment for which the local similarity measures are most accumulated in said two-dmensional memory.

* * * * *

UNITED STATES PATENT AND TRADEMARK OFFICE
CERTIFICATE OF CORRECTION

PATENT NO. : 4,646,352

DATED : February 24, 1987

INVENTOR(S) : Koh ASAI; Hiroyuki IZUMISAWA; Katsuaki OWADA; Seiichiro KINOSHITA; & Shunji MATSUNO, all of Tokyo Japan It is certified that error appears in the above-identified patent and that said Letters Patent is hereby corrected as shown below:

Column 1, line 11, change "finerprint" to --fingerprint--.
Column 2, line 37, change "condidates" to --candidates--.
Column 5, line 36, change "finerprint" to --fingerprint--.
Column 6, line 67, change "58" to --59--.
Column 8, line 39, change "54" to --56--.
Column 9, line 45, change "foor" to --for--.
Column 11, line 22, change "$d_p$" to --$d_q$--;
line 49, change "$d_q$" to --$d_p$--.
Column 12, line 11, change "capicity" to --capacity--.
Column 14, line 50, change "section" to --second--;
line 55, change "permunation" to --permutation--.
Column 15, line 41, change "and" to --through--.
Column 16, line 30, change "ist" to --list--.
Column 19, line 43, change "regerds" to --regards--.
Column 21, line 23, change equation no. "(6)" to --(5)--.
Column 23, line 4, change "T" (second occurrence) to --$T_d$--.
Column 24, line 35, delete "and" (first occurrence)

UNITED STATES PATENT AND TRADEMARK OFFICE
CERTIFICATE OF CORRECTION

PATENT NO. : 4,646,352

DATED : February 24, 1987      Page 2 of 2

INVENTOR(S) : Koh ASAI; Hiroyuki IZUMISAWA; Katsuaki OWADA; Seiichiro KINOSHITA; & Shunji MATSUNO, all of Tokyo Japan It is certified that error appears in the above-identified patent and that said Letters Patent is hereby corrected as shown below:

Column 26, line 19, change "proximade" to --proximate--;
          line 60, after "rendered" insert --empty--.
Column 32, line 57, change "As" to --At--.
Column 36, line 42, change "field" to --fields--;
          line 53, change "carried" to --carries--.
Column 38, line 20, change "dceision" to --decision--.

Signed and Sealed this

Tenth Day of May, 1988

*Attest:*

DONALD J. QUIGG

*Attesting Officer*    *Commissioner of Patents and Trademarks*